United States Patent
Shimizu

[19]

[11] Patent Number: 5,884,986
[45] Date of Patent: Mar. 23, 1999

[54] ANTI-LOCK BRAKE CONTROL SYSTEM FOR AUTOMOTIVE VEHICLES

[75] Inventor: Kouichi Shimizu, Kanagawa, Japan

[73] Assignee: Nissan Motor Co., Ltd., Yokohama, Japan

[21] Appl. No.: 818,671

[22] Filed: Mar. 14, 1997

[30] Foreign Application Priority Data

Mar. 15, 1996 [JP] Japan .................................. 8-059221
Mar. 19, 1996 [JP] Japan .................................. 8-062578

[51] Int. Cl.$^6$ .............................. B60T 13/18; B60T 8/88
[52] U.S. Cl. ................................ 303/122.12; 303/122.13; 303/10; 303/116.1; 303/122.1; 303/122.14
[58] Field of Search ..................... 303/122.03, 122.04, 303/122.05, 122.1, 122.09, 122.12, DIG. 3, DIG. 4, 122.13, 122.14, 116.1, 119.1, 116.2, 10, 11, 12, 122.11, 116.4, 122, 122.02, 122.06, 122.08; 701/34, 76, 92; 188/181 A, 181 R

[56] References Cited

U.S. PATENT DOCUMENTS 5,413,404  5/1995  Inagawa ............................. 303/122.12
5,545,929  8/1996  Fijioka et al. ..................... 303/DIG. 4
5,558,414  9/1996  Kubota .............................. 303/122.12
5,683,149  11/1997 Aizawa et al. .................... 303/DIG. 4
5,733,017  3/1998  Nakashima et al. ...................... 303/10
5,743,598  4/1998  Toda et al. ........................ 303/122.12

*Primary Examiner*—Douglas C. Butler
*Attorney, Agent, or Firm*—Foley & Lardner

[57] ABSTRACT

An anti-lock brake control system for an automotive vehicle, comprises a wheel-brake cylinder adapted to provide a braking action, a hydraulic pressure actuating unit adapted to be fluidly connected to the wheel-brake cylinder to feed and exhaust brake fluid to and from the wheel-brake cylinder, and having at least one reservoir tank provided for temporarily storing brake fluid exhausted from the wheel-brake cylinder via a return line and a return pump driven by an electric motor and provided for exhausting the brake fluid within the reservoir tank toward a main brake-fluid line, sensors provided for detecting wheel speeds, a controller for executing a skid control of the hydraulic pressure actuating unit in response to signals from the sensors, a diagnostic system for making a diagnosis on a trouble of said electric motor, and a monitoring device for monitoring an amount of brake fluid stored in said reservoir tank when said diagnostic system determines that said electric motor is in trouble. The controller terminates the skid control of the hydraulic pressure actuating unit when the amount of brake fluid reaches the full capacity.

17 Claims, 10 Drawing Sheets

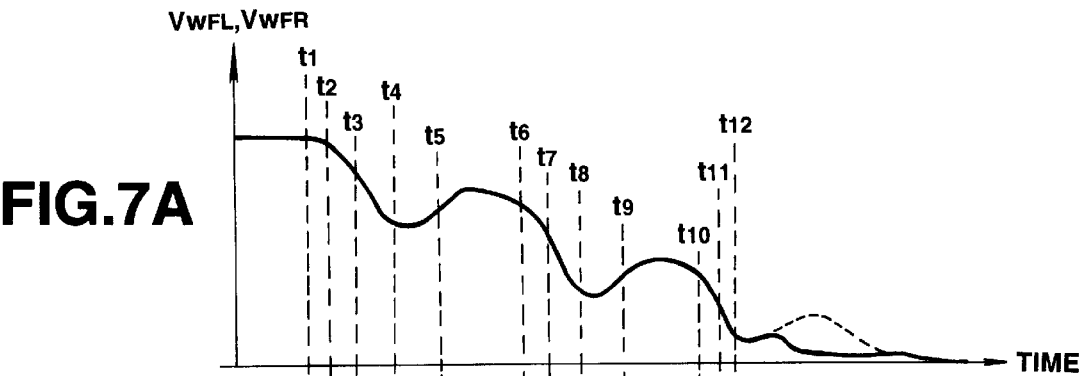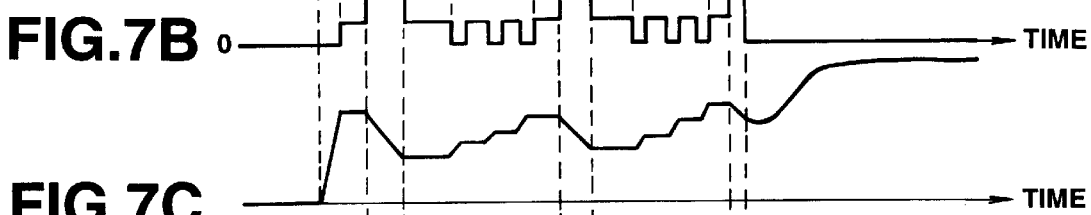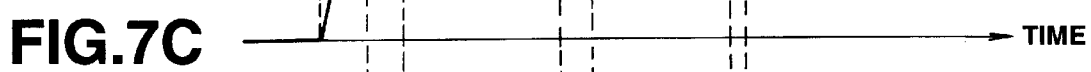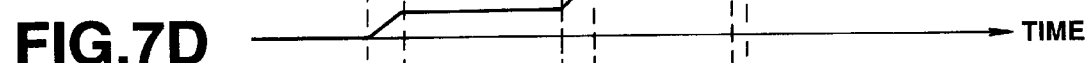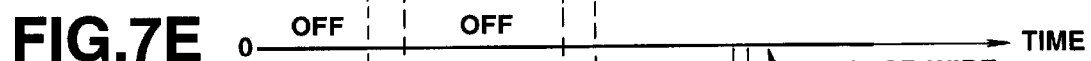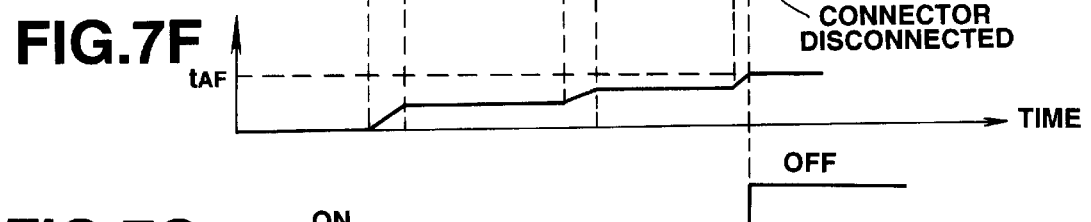

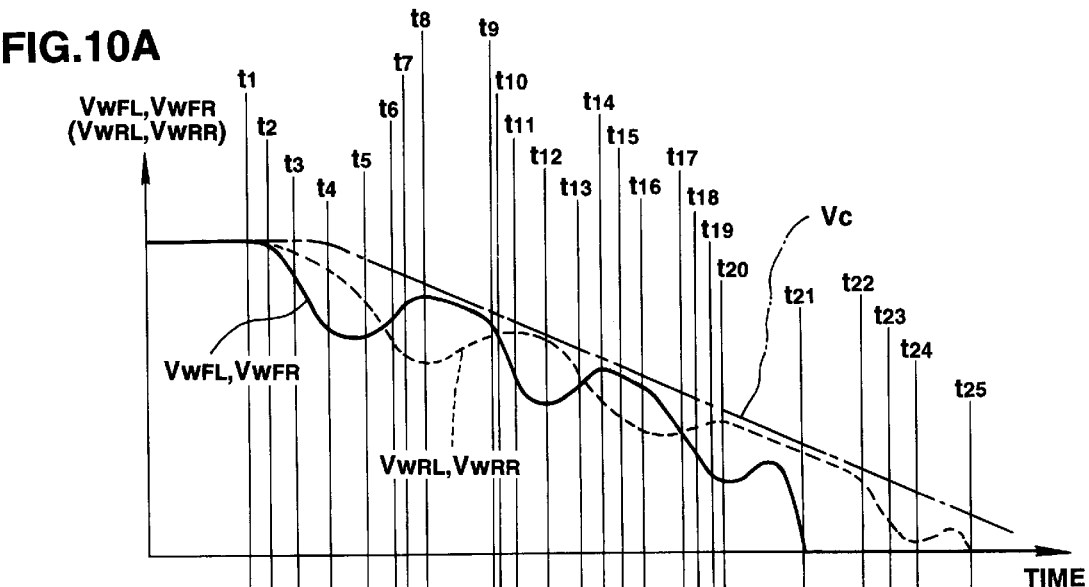
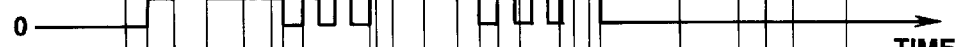
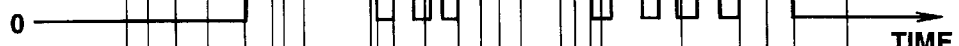
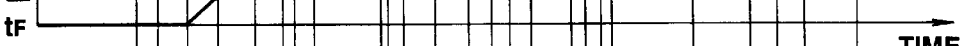

ic. On more later-model cars with an anti-lock brake system, a self-diagnostic system is often incorporated in the anti-lock brake system, to make a self-diagnosis on motor wire troubles such as a loose motor wire connector of an electric motor of a return pump, often called "ABS pump," fluidly disposed in a hydraulic actuator of the anti-lock brake system. As is generally known, the typical anti-lock brake system uses a reservoir tank as well as a return pump. The return pump is adapted to reduce the hydraulic pressure in a wheel-brake cylinder for a certain road wheel selected for the purpose of skid control. The reservoir tank is fluidly disposed in a brake line connected to both the inlet port of the return pump and the wheel-brake cylinder for temporarily accumulating the brake fluid exhausted from the cylinder as a result of reduction in the pressure in the cylinder. The return pump included in the ABS is usually driven by way of an electric motor. In the event that the motor wire connector of the motor-driven return pump is disconnected or the motor wire itself is burnt out during operation of the ABS, the anti-skid control terminates in an abrupt manner (for a brief moment such as 0.1 sec or less). Thus, it is necessary to make a self-diagnosis upon the abnormality of the motor associated with the return pump. On conventional anti-lock brake systems with a self-diagnostic system which makes a self-diagnosis on the abnormality of the motor of a return pump, the anti-lock brake system is generally designed to terminate the system operation and to permit normal application of the brakes, immediately when the self-diagnostic system decides the presence of abnormality of the electric motor of the ABS pump during operation of the ABS. As can be appreciated, if normal application of the brakes restarts as soon as the system decides the motor of the ABS pump is in trouble during the skid control, a satisfactory anti-lock brake control action cannot be provided and thus a satisfactory convergence of a skid of the skidding less-traction wheel cannot be accomplished due to a rapid transition from skid control to normal braking.

SUMMARY OF THE INVENTION

Accordingly, it is an object of the invention to provide an anti-lock brake control system for automotive vehicles which avoids the aforementioned disadvantages of the prior art.

It is another object of the invention to provide an automotive anti-lock brake control system with a self-diagnostic system, which provides an adequate skid control, even in the presence of motor trouble (e.g., a loose motor wire connector, a motor wire burned out, a broken motor coil, a motor circuit shorted or the like) of an electric motor of a return pump (or an ABS pump) employed in the anti-lock brake control system.

In order to accomplish the aforementioned and other objects of the present invention, an anti-lock brake control system for an automotive vehicle, comprises a wheel-brake cylinder associated with either one of road wheels to provide a braking action at the associated road wheel being controllable according to a skid control when beginning to skid at the associated road wheel, a hydraulic pressure actuating unit adapted to be fluidly connected to the wheel-brake cylinder to feed and exhaust brake fluid to and from the wheel-brake cylinder, and having at least one reservoir tank provided for temporarily storing brake fluid exhausted from the wheel-brake cylinder via a return line and a return pump driven by an electric motor and provided for exhausting the brake fluid stored in the reservoir tank toward a main brake-fluid line, wheel speed sensors provided for detecting wheel speeds of the road wheels and for generating signals indicative of the wheel speeds, a controller for executing a skid control of the hydraulic pressure actuating unit in response to the signals from the wheel speed sensors, a diagnostic system for making a diagnosis on a trouble of the electric motor, and a monitoring device for monitoring an amount of brake fluid stored in the reservoir tank when the diagnostic system determines that the electric motor is in trouble, wherein the controller terminates the skid control of the hydraulic pressure actuating unit when the amount of brake fluid monitored by the monitoring device reaches a preset value. Preferably, the hydraulic pressure actuating unit may comprise a first hydraulic actuator fluidly connected to front wheel-brake cylinders and having a first reservoir tank for temporarily storing brake fluid exhausted from the front wheel-brake cylinders via a first return line and a common return pump driven by an electric motor and provided for exhausting the brake fluid stored in the first reservoir tank toward a first main brake-fluid line, and a second hydraulic actuator fluidly connected to rear wheel-brake cylinders and having a second reservoir tank for temporarily storing brake fluid exhausted from the rear wheel-brake cylinders via a second return line separated from the first return line and the common return pump and provided for exhausting the brake fluid stored in the second reservoir tank toward a second main brake-fluid line separated from the first main brake-fluid line, and the monitoring device are configured to monitor an amount of brake fluid stored in the first reservoir tank and an amount of brake fluid stored in the second reservoir tank as an individual data when the diagnostic system determines that the electric motor is in trouble, wherein the controller terminates a skid control of the first hydraulic actuator when the amount of brake fluid stored in the first reservoir tank reaches a first preset value, and terminates a skid control of the second hydraulic actuator when the amount of brake fluid stored in the second reservoir tank reaches a second preset value.

The monitoring device may be configured to estimate the amount of brake fluid stored in the first reservoir tank by counting an integrated value of time intervals of pressure-reduction modes during the skid control of the first hydraulic actuator and to estimate the amount of brake fluid stored in the second reservoir tank by counting an integrated value of time intervals of pressure-reduction modes during the skid control of the second hydraulic actuator, when the diagnostic system determines that the electric motor is in trouble. Alternatively, the monitoring device may be configured to measure a volumetric flow of brake fluid flowing into the first reservoir tank and a volumetric flow of brake fluid flowing into the second reservoir tank, and to estimate the amount of brake fluid stored in the first reservoir tank and the amount of brake fluid stored in the second reservoir tank by individually integrating the volumetric flows measured at the first and second reservoir tanks, when the diagnostic system determines that the electric motor is in trouble. Preferably the monitoring device may be configured to directly detect the amount of brake fluid stored in each of the first and second reservoir tanks, when the diagnostic system determines that the electric motor is in trouble.

According to another aspect of the invention, an anti-lock brake control system for an automotive vehicle, comprises wheel-brake cylinders each associated with either one of road wheels to provide a braking action at the associated road wheel being controllable according to a skid control when beginning to skid at the associated road wheel, a first hydraulic actuator adapted to be fluidly connected to front wheel-brake cylinders associated with a first section of a tandem master cylinder to feed and exhaust brake fluid to and from the front wheel-brake cylinders, and having a first reservoir tank provided for temporarily storing brake fluid exhausted from the front wheel-brake cylinders via a first return line and a common return pump driven by an electric motor and provided for exhausting the brake fluid stored in the first reservoir tank toward a first main brake-fluid line, a second hydraulic actuator adapted to be fluidly connected to rear wheel-brake cylinders associated with a second section of the tandem master cylinder to feed and exhaust brake fluid to and from the rear wheel-brake cylinders, and having a second reservoir tank provided for temporarily storing brake fluid exhausted from the rear wheel-brake cylinders via a second return line and the common return pump and provided for exhausting the brake fluid stored in the second reservoir tank toward a second main brake-fluid line separated from the first main brake-fluid line, wheel speed sensors provided for detecting wheel speeds of the road wheels and for generating signals indicative of the wheel speeds, a controller for executing skid controls of the first and second hydraulic actuators in response to the signals from the wheel speed sensors, a diagnostic system for making a diagnosis on a trouble of the electric motor, and a monitoring device for monitoring individually an amount of brake fluid stored in the first reservoir tank and an amount of brake fluid stored in the second reservoir tank when the diagnostic system determines that the electric motor is in trouble, wherein the controller terminates the skid control of the first hydraulic actuator when the amount of brake fluid stored in the first reservoir tank reaches a first preset value, and terminates a skid control of the second hydraulic actuator when the amount of brake fluid stored in the second reservoir tank reaches a second preset value. In such a case, preferably, the monitoring device may be configured to estimate the amount of brake fluid stored in the first reservoir tank by counting an integrated value of time intervals of pressure-reduction modes during the skid control of the first hydraulic actuator and to estimate the amount of brake fluid stored in the second reservoir tank by counting an integrated value of time intervals of pressure-reduction modes during the skid control of the second hydraulic actuator, when the diagnostic system determines that the electric motor is in trouble. Alternatively, the monitoring device may be configured to measure a volumetric flow of brake fluid flowing into the first reservoir tank and a volumetric flow of brake fluid flowing into the second reservoir tank, and to estimate the amount of brake fluid stored in the first reservoir tank and the amount of brake fluid stored in the second reservoir tank by individually integrating the volumetric flows measured at the first and second reservoir tanks, when the diagnostic system determines that the electric motor is in trouble. In another, the monitoring device may be configured to directly detect the amount of brake fluid stored in each of the first and second reservoir tanks, when the diagnostic system determines that the electric motor is in trouble.

According to a further aspect of the invention, a method for preventing a skid of an automotive vehicle having an anti-lock brake control system in combination with a motor-trouble diagnostic system, the anti-lock brake control system having a common return pump and a first reservoir tank connected to a first return line and associated with front road wheels and a second reservoir tank connected to a second return line separated from the first return line and associated with rear road wheels, and the return pump having a driven connection with an electric motor, the method comprises the steps of detecting wheel speeds of the front and rear road wheels installed on the vehicle and for generating wheel-speed signals indicative of the wheel speeds, computing a slip ratio of each of the road wheels and a derivative value of each of the road wheels in response to the wheel-speed signals, comparing the slip ratio with a predetermined target slip ratio to produce a first comparison data, comparing the derivative value with both a predetermined threshold for an acceleration and a predetermined threshold for a deceleration to produce a second comparison data, performing a skid control of each of the road wheels in response to the first and second comparison data, making a diagnosis on a trouble of the electric motor, determining whether an amount of brake fluid stored in the first reservoir tank reaches a full capacity of the first reservoir tank, determining whether an amount of brake fluid stored in the second reservoir tank reaches a full capacity of the second reservoir tank, and simultaneously terminating a skid control of the front road wheels and a skid control of the rear road wheels when satisfying one of a necessary condition that the amount of brake fluid stored in the first reservoir tank reaches the full capacity of the first reservoir tank and a necessary condition that the amount of brake fluid stored in the second reservoir tank reaches the full capacity of the second reservoir tank.

According to another aspect of the invention, a method for preventing a skid of an automotive vehicle having an anti-lock brake control system in combination with a motor-trouble diagnostic system, the anti-lock brake control system having a common return pump and a first reservoir tank connected to a first return line and associated with front road wheels and a second reservoir tank connected to a second return line separated from the first return line and associated with rear road wheels, and the return pump having a driven connection with an electric motor, the method comprises the steps of detecting wheel speeds of the front and rear road wheels installed on the vehicle and for generating wheel-speed signals indicative of the wheel speeds, computing a slip ratio of each of the road wheels and a derivative value of each of the road wheels in response to the wheel-speed signals, comparing the slip ratio with a predetermined target slip ratio to produce a first comparison data, comparing the derivative value with both a predetermined threshold for an acceleration and a predetermined threshold for a deceleration to produce a second comparison data, performing a skid control of each of the road wheels in response to the first and second comparison data, making a diagnosis on a trouble of the electric motor, determining whether an amount of brake fluid stored in the first reservoir tank reaches a full capacity of the first reservoir tank, determining whether an amount of brake fluid stored in the second reservoir tank reaches a full capacity of the second reservoir tank, simultaneously terminating a skid control of the front road wheels and a skid control of the rear road wheels when satisfying a necessary condition that the amount of brake fluid stored in the second reservoir tank reaches the full capacity of the second reservoir tank irrespective of whether a necessary condition that the amount of brake fluid stored in the first reservoir tank reaches the full capacity of the first reservoir tank is satisfied.

BRIEF DESCRIPTION OF THE DRAWINGS

FIGS. 7A through 7G, inclusive, are flow charts illustrating the operation of the ABS (related to the flow chart shown in FIG. 5).

FIGS. 10A through 10G, inclusive, are flow charts illustrating the operation of the ABS (related to the flow chart shown in FIG. 9).

DESCRIPTION OF THE PREFERRED EMBODIMENTS

Figure 1:
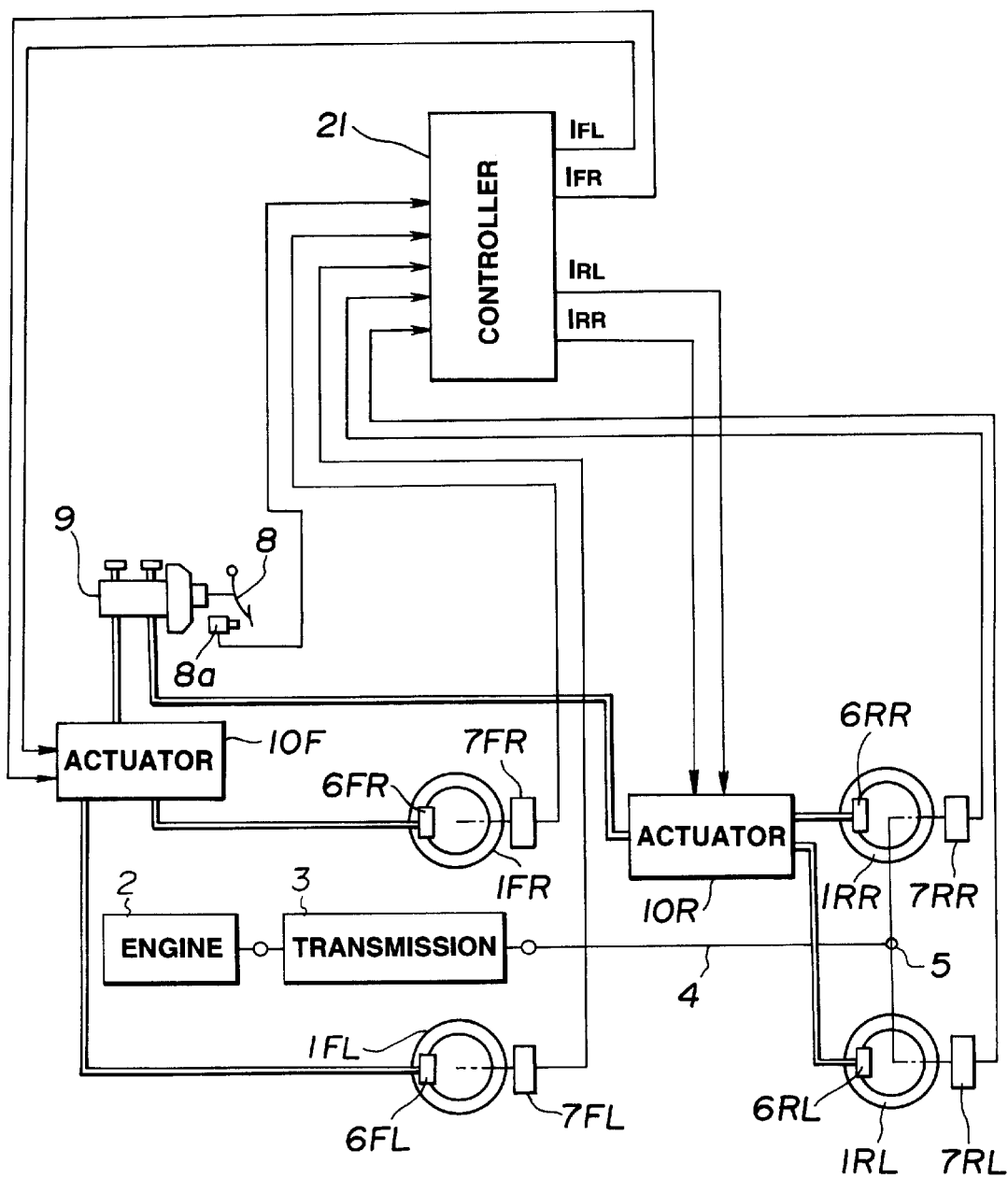
FIG. 1 is a system diagram illustrating one embodiment of an anti-lock brake control system (abbreviated to "ABS") of the invention.
Figure 2:
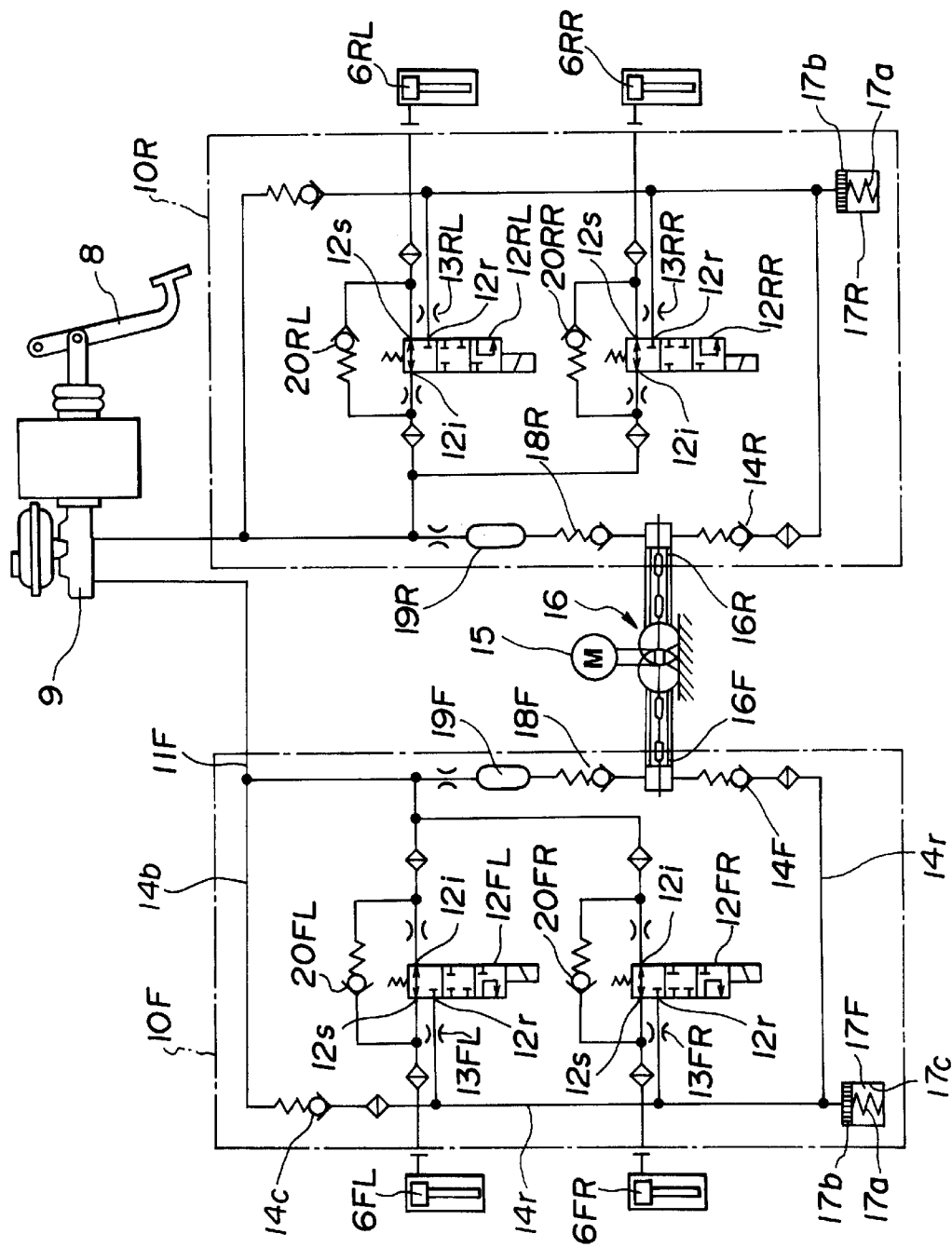
FIG. 2 is a hydraulic system diagram illustrating a hydraulic actuator being applicable to the ABS shown in FIG. 1.

Referring now to the drawings, particularly to FIG. 1, the automotive anti-lock brake control system of the invention is exemplified in case of a rear-wheel drive vehicle having front-left and front-right driven wheels 1FL and 1FR and rear-left and rear-right drive wheels 1RL and 1RR. The power of the engine 2 is transmitted through the transmission 3, the propeller shaft 4 and the differential 5 via rear axle shafts to the rear road wheels 1RL and 1RR. For hydraulic braking action, four wheel-brake cylinders 6FL through 6RR are installed on the respective road wheels 1FL through 1RR. Front-left and front-right wheel speed sensors 7FL and 7FR are located in the respective front wheels 1FL and 1FR, for producing front-left and front-right wheel speed indicative signals $V_{FL}$ and $V_{FR}$ in the form of an alternating current (ac) of a sine wave. The higher the rotational speed of the wheel, the higher the frequency of the ac. In the same manner, rear-left and rear-right wheel speed sensors 7RL and 7RR are located in the respective rear wheels 1RL and 1RR, for creating rear-left and rear-right wheel speed indicative signals $V_{RL}$ and $V_{RR}$ in the form of an alternating current (or a sinusoidal-wave signal). The earlier-model rear-wheel drive vehicle ordinarily uses a dual-brake system as seen in FIG. 1. The dual-brake system has a master cylinder 9 with two pistons (not shown) set in tandem. In a conventional manner, in the dual-brake system, two separate hydraulic sections function independently. The master-cylinder pressure in a first hydraulic-pressure chamber (e.g., a front section) of the tandem master cylinder 9 is fed through a front-wheel side hydraulic actuator 10F (a hydraulic pressure actuating unit for the front wheel brake cylinders) to the two front wheel-brake cylinders 6FL and 6FR, whereas the master-cylinder pressure in a second hydraulic-pressure chamber (e.g., a rear section) of the tandem master cylinder 9 is fed through a rear-wheel side hydraulic actuator 10R (a hydraulic pressure actuating unit for the rear wheel brake cylinders) to the two rear wheel-brake cylinders 6RL and 6RR. The master-cylinder pressure increases in response to the magnitude of a push (or a depression) of the brake pedal 8. As clearly seen in FIG. 2, the front-wheel side hydraulic actuator 10F is fluidly connected to the front section of the master cylinder 9 through a main brake-fluid line 11F (mainly serving as a brake-fluid supply line). A typical three-port, three-position electromagnetic solenoid valve 12FL is fluidly disposed between the front-left wheel-brake cylinder 6FL and the front brake line 11F. In the same manner, the solenoid valve 12FR is fluidly disposed between the associated front-right wheel-brake cylinder 6FR and the front brake line 11F. As regards each of the three-port, three-position solenoid valves, reference signs 12i, 12s, 12r respectively denote an inlet port, a supply port, and a return port. The inlet port 12i is connected to the front brake line 11F, the supply port 12s is connected to the associated wheel-brake cylinder, and the return port 12r is connected to a return line 14r through a fixed orifice as denoted by 13FL or 13FR and then connected via an inlet check valve 14F (provided in the return line 14r) to the suction port of a first pump section 16F of a return pump assembly 16. A front-wheel side reservoir tank 17F is connected to the return line 14r downstream of the respective fixed orifices 13FL and 13FR and upstream of the inlet check valve 14F. As seen in FIG. 2, the reservoir tank 17F is comprised of at least a return spring 17a, a piston 17b and a cylindrical housing 17c. The piston 17b of the reservoir tank 17F is biased toward its initial position (the spring-biased position) by way of the return spring 17a. The reservoir tank 17F is designed to feed the brake fluid therein through a part of the return line 14r, a check valve 14c and a by-pass line 14b to the brake line 11F by virtue of the bias of the spring 17a when the master-cylinder pressure drops down to a predetermined pressure level. That is, the reservoir tank 17F is designed so that the brake fluid temporarily stored and prevailing in the tank 17F is completely exhausted out of the tank 17F towards the brake line 11F, when the brakes are fully released without any depression of the brake pedal 8. The respective solenoid valves 12FL and 12FR are electronically connected to an anti-lock brake controller 21 which will be fully described later. Each of the three-port, three-position solenoid valve has an electromagnetic solenoid SL and is operated in response to the magnitude of a solenoid drive current (or an exciting current) applied thereto by the controller 21. A fluid communication between the inlet port 12i and the supply port 12s is established and the return port 12r is shut off from a communication of the supply port 12s when the exciting current Ii (i=FL, FR, RL, RR) applied to the solenoid SL is a zero current value. This means that the solenoid valve is kept in the pressure build-up position in presence of the zero-current signal. When the exciting current applied to the solenoid is a predetermined medium current value, the three ports 12i, 12s and 12r are all shut off from each other. This means that the solenoid valve is kept in the pressure hold position in the case of application of the exciting current of the predetermined medium current level. When the exciting current applied to the solenoid is a predetermined high current value, a fluid communication between the supply port 12s and the return port 12r is established and the inlet port 12i is shut off. This means that the solenoid valve is kept in the pressure reduction position in the case of application of the exciting current of the predetermined high current value. The first pump section 16F serves to return the brake fluid in the return line 14r through an outlet check valve 18F and a damper 19F to the front brake line 11F. The damper 19F has a dampening chamber to dampen or attenuate fluctuations in a discharge pressure of the brake fluid discharged from the return pump. A one-way check valve 20FL with a set-pressure spring is fluidly disposed in a by-pass line which is arranged in parallel with the associated solenoid valve 12FL in a manner so as to be connected to the inlet port 12i and the supply port 12s. Similarly, a one-way check valve 20FR with a set-pressure spring is fluidly disposed in a by-pass line which is arranged in parallel with the associated solenoid valve 12FR. The respective check valve 20FL or 20FR serves to permit fluid flow from the supply port 12s to the inlet port 12i when the fluid pressure within the supply port exceeds a predetermined pressure level determined by the set-pressure spring. The construction of the rear-wheel side hydraulic actuator 10R is similar to that of the front-wheel side hydraulic actuator 10F set out above. Also, as seen in FIG. 2, the left-hand hydraulic circuit (having the front-wheel side hydraulic actuator 10F) and the right-hand hydraulic circuit (having the rear-wheel side hydraulic actuator 10R) are symmetrical with each other. Therefore, detailed description of the rear-wheel side hydraulic actuator 10R will be omitted because the construction of the actuator 10R seems to be self-explanatory. In comparison of the rear hydraulic actuator 10R with the front hydraulic actuator 10F, reference signs 12RL and 12RR denote rear-left and rear-right three-port, three-position solenoid valves, reference signs 13RL and 13RR denote fixed orifices, reference signs 14R and 18R denote inlet and outlet check valves, reference sign 16R denotes a second pump section of the return pump assembly 16, reference sign 17R denotes a rear-wheel side reservoir tank, reference sign 19R denotes a damper with a dampening chamber, and reference signs 20RL and 20RR denote one-way check valves each having a set-pressure spring. The above-mentioned return pump assembly 16 includes an electric motor 15 for driving both the first and second pump sections 16F and 16R. In the shown embodiment, although a plunger pump is used, another type of hydraulic pump may be used as a return pump of the ABS. Returning to FIG. 1, a brake lamp switch (or a stop lamp switch) 8a is also provided near the brake pedal 8. In a conventional manner, the brake lamp switch 8a is operated in response to depression of the brake pedal. When the brakes are released, electric contacts of the brake lamp switch 8a remain opened, and thus a signal from the switch 8a is maintained at a low signal level (a switched-OFF signal). With the brake pedal depressed, a signal from the switch 8a is maintained at a high signal level (a switched-ON signal). The controller 21 receives the signal from the brake lamp switch 8a, and the wheel-speed indicative ac voltage signals $V_{FL}$, $V_{FR}$, $V_{RL}$ and $V_{RR}$ from the four wheel-speed sensors 7FL through 7RR.

Figure 3:
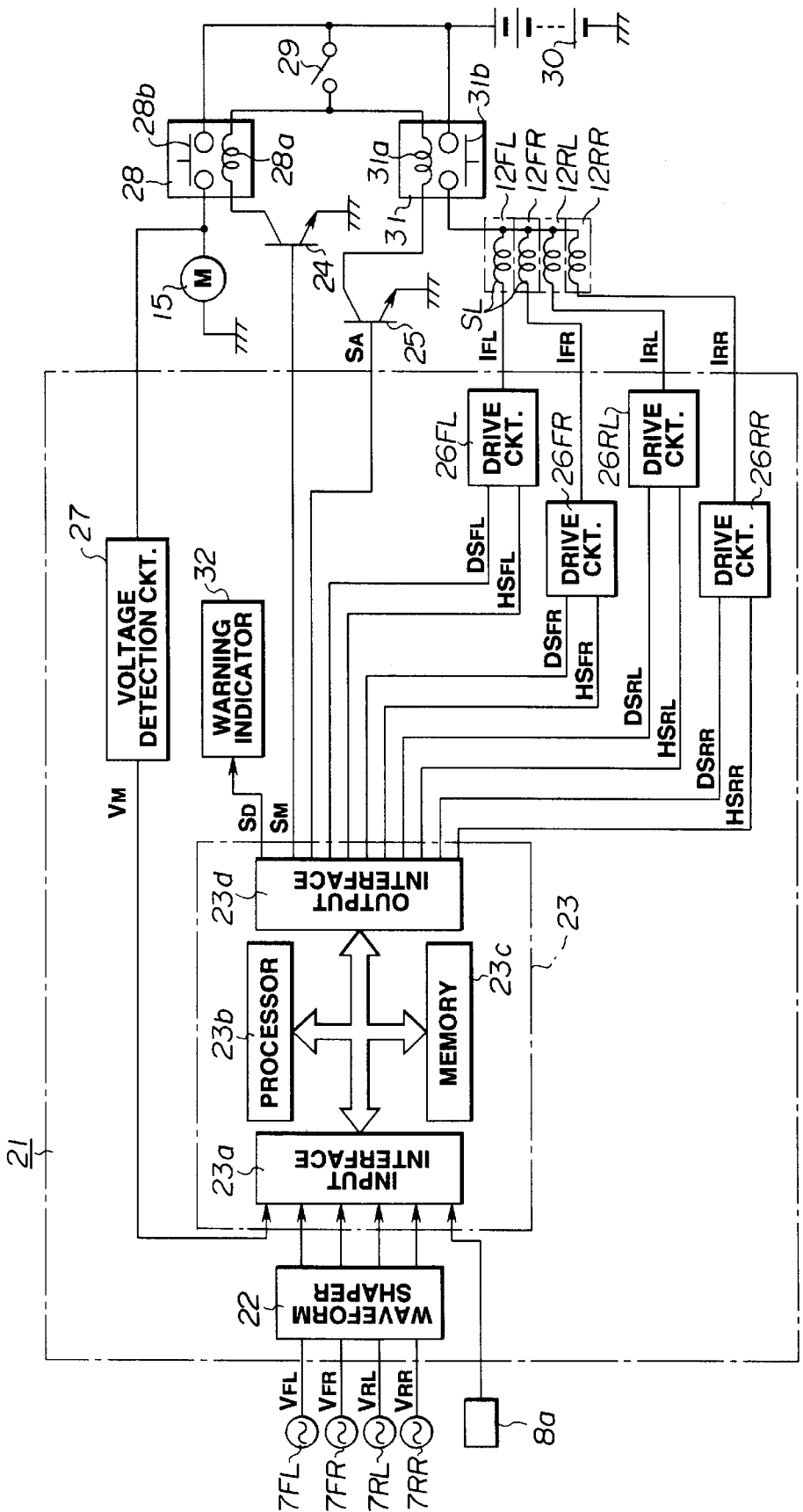
FIG. 3 is a block diagram illustrating a control circuit being applicable to the ABS shown in FIG. 1.

Referring now to FIG. 3, the controller 21 includes a waveform shaping circuit (or a waveform shaper) 22, a microcomputer 23, four solenoid drive circuits 26FL through 26RR associated with the respective solenoids SL of the solenoid valves 12FL through 12RR, a motor-relay monitoring circuit (or a motor voltage detection circuit) 27 and a warning indicator 32. The microcomputer 23 is comprised of an input interface circuit (or an input interface) 23a, a processor 23b, a memory 23c and an output interface circuit (or an output interface) 23d. As seen in FIG. 3, the processor 23b and the memory 23c are mutually connected to each other for automatic transmission and reception of information. The waveform shaping circuit 22 is connected between the four wheel-speed sensors 7FL through 7RR and the input interface circuit 23a, for converting the ac voltage signals $V_{FL}$, $V_{FR}$, $V_{RL}$ and $V_{RR}$ from the sensors 17FL through 17RR to rectangular signals by multiplying each of the voltage signals received and waveform-shaping the multiplied voltage signal. The waveform shaping circuit 22 performs an analog-to-digital conversion (simply A/C conversion). The input interface circuit 23a receives the four rectangular signals from the waveform shaping circuit 22, the signal from the brake lamp switch 8a, and a voltage signal VM (essentially corresponding to a terminal voltage applied to the motor 15) from the motor-relay monitoring circuit 27. The processor 23b is provided for making a diagnosis on the presence or absence of the abnormality of the electric motor 15 for the two hydraulic actuators 10F and 10R, and for executing one sub-routine shown in FIG. 5 or another sub-routine shown in FIG. 9, as described in detail later. For instance, the processor 23b computes a front-left wheel speed VWFL, a front-right wheel speed VWFR, a rear-left wheel speed VWRL, and a rear-right wheel speed VWRR on the basis of the four rectangular signals input into the input interface circuit 23a, and also computes or determines a so-called pseudo vehicle speed Vc on the basis of the four computed wheel speed data VWFL, VWFR, VWRL and VWRR to derive slip ratios SFL, SFR, SRL and SRR of the respective wheels and to perform an anti-lock brake control for at least one road wheel (precisely a wheel-brake cylinder) selected for the purpose of skid control through comparison of the four slip ratios SFL to SRR with a target slip ratio So for example 15%. The memory 23c is provided for temporarily storing results of the arithmetic processing (the sub-routine) executed by the processor 23b and for transmitting the data temporarily stored to the processor 23b in case of necessity. The output interface circuit 23d is responsive to the results of the arithmetic processing executed by the processor 23b to output various control signals SD, SM, SA, DSi (i=FL, FR, RL and RR), and HSi (i=FL, FR, RL and RR). The base of a first npn transistor 24 is connected to the output interface circuit 23d for receiving a motor-relay driving signal (or a motor control signal) SM to energize the motor 15 with the motor relay 28 turned ON. The base of a second npn transistor 25 is connected to the output interface circuit 23d for receiving an actuator-relay driving signal SA (or an actuator control signal) to energize the solenoid SL of the solenoid valve associated with the road wheel which is subjected to the skid control, with the actuator relay turned ON. The front-left solenoid drive circuit 26FL receives the front-left wheel pressure-reduction indicative signal DSFL and the front-left wheel pressure-hold indicative signal HSFL from the output interface circuit 23d to produce an exciting current IFL depending on whether each of the two signal values of the signals DSFL and HSFL is a high signal level or a low signal level. The front-right solenoid drive circuit 26FR receives the front-right wheel pressure-reduction indicative signal DSFR and the front-right wheel pressure-hold indicative signal HSFR from the output interface circuit 23d to produce an exciting current IFR depending on both the signal values of the signals DSFR and HSFR. The rear-left solenoid drive circuit 26RL receives the rear-left wheel pressure-reduction indicative signal DSRL and the rear-left wheel pressure-hold indicative signal HSRL from the output interface circuit 23d to produce an exciting current IRL depending on both the signal values of the signals DSRL and HSRL. The rear-right solenoid drive circuit 26RR receives the rear-right wheel pressure-reduction indicative signal DSRR and the rear-right wheel pressure-hold indicative signal HSRR from the output interface circuit 23d to produce an exciting current IRR depending on both the signal values of the signals DSRR and HSRR. The motor-relay monitoring circuit (the voltage detection circuit) 27 is connected to the electric line interconnecting the positive terminal of the motor 15 and one electric contact of the motor relay 28, for monitoring or detecting the terminal voltage VM of the motor. The other electric contact of the motor relay 28 is connected to the positive terminal of the car battery. One end of the exciting coil 28a of the motor relay is connected to the collector of the npn transistor 24, while the other end of the exciting coil 28a is connected through an ignition switch 29 to the battery positive terminal. The emitter of the first transistor 24 is grounded. When the motor-relay driving signal SM is kept at a low signal level, the exciting coil 28a is de-energized with the transistor 24 turned OFF and thus the motor relay 28 remains OFF. On the contrary when the signal SM is shifted to a high signal level, the exciting coil 28a is energized with the transistor 24 turned ON and thus the motor relay 28 is turned ON. Each of the motor relay 28 and the actuator relay 31 is a typical normally-closed type relay. When the armature 28b of the relay 28 is activated with the transistor 24 turned ON, the two relay contacts of the relay 28 are closed by the relay armature 28b and thus the battery voltage is applied to the input terminal of the motor 15 through the relay 28 turned ON. This terminal voltage applied to the motor 15 is detected by means of the previously-noted motor-relay monitoring circuit 27. On the other hand, one solenoid terminal of each of the solenoid valves 12FL through 12RR is connected to the associated solenoid drive circuit, whereas the other solenoid terminal is connected to one relay contact of the actuator relay 31 for the purpose of activation of the solenoid. The other relay contact of the relay 31 is connected to the battery positive terminal. One end of the exciting coil 31a of the actuator relay 31 is connected to the collector of the second npn transistor 25, while the other end of the exciting coil 31a is connected through the ignition switch 29 to the positive terminal of the car battery 30. The emitter of the transistor 25 is earthed through the car frame for example. When the actuator-relay driving signal SA is maintained at a low signal level, the exciting coil 31a is not excited with the transistor 25 turned OFF and thus the actuator relay 31 remains switched OFF. Conversely, when the signal SA is changed from a low signal level to a high signal level, the relay coil 31a is excited and thus the relay armature 31b is activated as a result of the turned-on transistor 25.

Each of the solenoid drive circuits 26FL, 26FR, 26RL and 26RR operates as follows.

When both the pressure-reduction indicative signal DSi (i=FL, FR, RL, RR) and the pressure-hold indicative signal HSi (i=FL, FR, RL, RR) input from the output interface circuit 23d to the solenoid drive circuit 26i (i=FL, FR, RL, RR) are low signal levels, no current flows across the solenoid SL of the solenoid valve 12i (i=FL, FR, RL, RR) and thus the solenoid SL is deenergized, with the result that the wheel-brake cylinder associated with the solenoid valve 12i (being in inoperative) operates at the pressure build-up mode. When only the pressure-hold indicative signal HSi of the two signals applied to the solenoid drive circuit 26i is a high level, an exciting current Ii of a predetermined medium current value is applied to the solenoid SL of the solenoid valve 12i and as a result the wheel-brake cylinder associated with the solenoid valve 12i (held at the pressure-hold position) operates at the pressure hold mode. When only the pressure-reduction indicative signal DSi of the two signals applied to the solenoid drive circuit 26i is a high level, an exciting current of a predetermined high current value is applied to the solenoid SL of the solenoid valve 12i and as a result the wheel-brake cylinder associated with the solenoid valve 12i (maintained at the pressure-reduction position) operates at the pressure-reduction mode.

Figure 4:
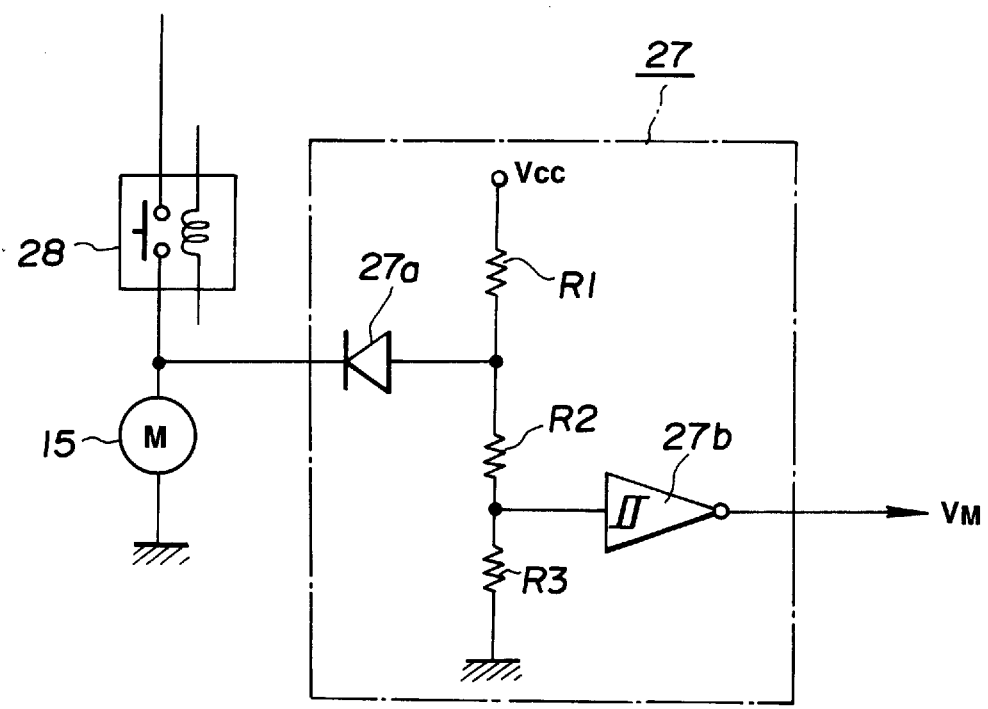
FIG. 4 is a block diagram illustrating a voltage detection circuit being applicable to the control circuit shown in FIG. 3.

Referring now to FIG. 4, there is shown one example of the voltage detection circuit (the motor-relay monitoring circuit) 27. The voltage detection circuit 27 shown in FIG. 4 comprises a diode 27a, three resistors R1, R2, R3 and a Schmitt trigger circuit 27b. An anode of the diode 27a is connected to the connection line interconnecting the relay contact of the motor relay 28 and the motor 15, whereas a cathode of the diode 27a is connected to the positive terminal Vcc of the battery 30 through the resistor R1 and also grounded through the resistor set (R2 and R3) serving as a voltage divider. The connection point between the two resistors R2 and R3 is connected to the input terminal of the Schmitt trigger circuit 27b. The Schmitt trigger circuit 27b outputs the voltage signal VM of a low voltage level when the voltage applied thereto is below a preset voltage level, and outputs the voltage signal VM of a high voltage level when the voltage applied thereto is above the preset voltage level. The voltage signal VM from the Schmitt trigger circuit 27b is transmitted to the input interface circuit 23a. Actually, the Schmitt circuit 27b functions to generate the voltage signal VM of a high voltage level when the electric motor 15 operates normally with the relay 28 turned ON. That is, the resistance of the motor coil of the motor 15 is a very small value in the absence of the abnormality of the motor such as breaking of the motor coil, and thus the current flows from the positive terminal Vcc through the resistor R1 and the diode 27a and across the motor coil so as to normally drive the motor. Therefore if the motor operates normally, the voltage applied to each of the resistor R2 and R3 is almost zero, because the current directed toward the resistor set (the voltage divider) R2 and R3 is almost zero. Therefore, when the motor 15 operates normally without any motor troubles, the voltage applied to the input terminal of the Schmitt trigger circuit 27b is nearly equal to the battery voltage Vcc higher than the preset voltage level. In this case, a level of the voltage signal VM from the Schmitt trigger circuit 27b is high. On the contrary, in the presence of motor troubles for example a broken motor coil, a loose motor wire connector, a motor wire burned out, a motor wire short-circuited or the like, the electric current flow from the battery positive terminal (or the source of electric power) is directed toward the two resistors R2. and R3 but not the motor 15. In such a case, the electric current flows from the positive terminal Vcc through the resistors R2 and R3 to the ground, and as a result the voltage applied to the input terminal of the Schmitt circuit 27b is divided by way of the two resistors R2 and R3. Accordingly, the voltage applied to the input terminal of the Schmitt circuit becomes considerably lower in comparison with the preset voltage level. In this case, the voltage signal VM from the Schmitt circuit 27b is kept at a low level. Additionally, the output interface circuit 23d generates the warning signal SD to the warning indicator 32. Usually the warning signal SD remains low. The output interface circuit 23d generates the warning signal SD of a high signal level, if the controller determines that the motor causes trouble (such as a loose motor wire connector, a broken motor wire, a motor coil burnt out, a motor circuit shortened or the like) of the electric motor 15 on the basis of the results of the arithmetic processing of FIG. 5 which will be fully described later. The warning indicating circuitry or device 32, which is ordinarily installed on the instrument panel of the vehicle and includes a warning indicator lamp, is activated in responsive to the warning signal $S_D$ of a high signal level such as a logical value "1" so as to flash on and off the warning indicator lamp for example. The warning indicating circuit 32 may also include a warning buzzer which emits a buzzing sound cyclically for a predetermined time duration such as 3 minutes to warn the driver or the vehicle occupants that the electric motor 15 is faulty. Hereinafter described in detail in accordance with the flow chart shown in FIG. 5 is the arithmetic processing executed by the processor 23b of the microcomputer 23 incorporated in the controller 21.

Figure 5:
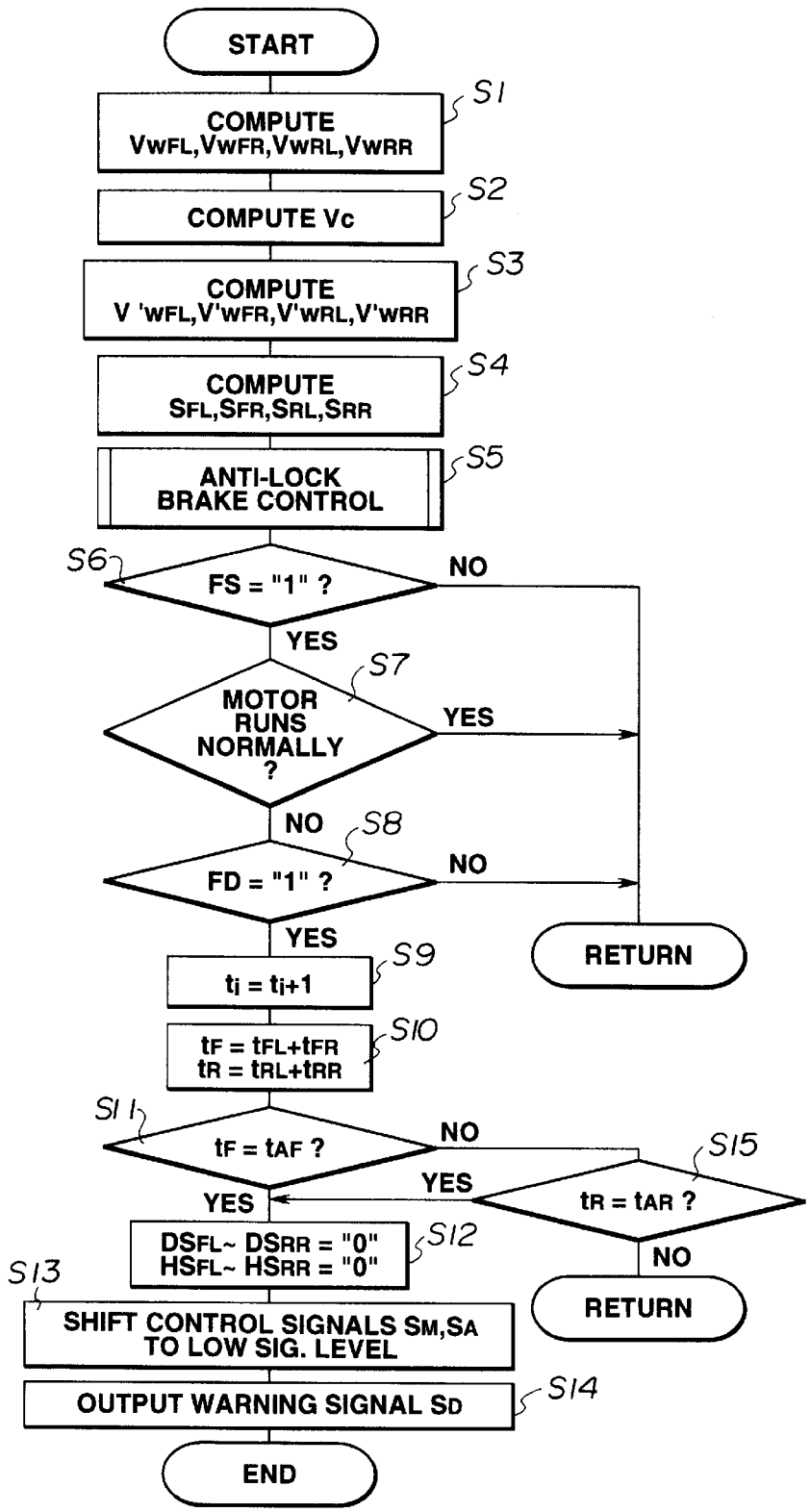
FIG. 5 is a flow chart illustrating one example of a sub-routine (a control procedure) executed by a microcomputer employed in the control circuit shown in FIG. 3.

The arithmetic processing or the sub-routine shown in FIG. 5 is executed as time-triggered interrupt routines to be triggered every predetermined intervals such as 10 msec.

In step S1, four wheel-speed data $V_{WFR}$, $V_{WFR}$, $V_{WRL}$ and $V_{WRR}$ are computed on the basis of a nominal value of the outside diameter of the tire and the wheel-speed indicative signals $V_{FL}$, $V_{FR}$, $V_{RL}$ and $V_{RR}$ from the sensors 7FR through 7RR. In step S2, a so-called pseudo vehicle speed Vc is estimated on the basis of the highest one $V_{WH}$ of the four wheel-speed data $V_{WFR}$, $V_{WFR}$, $V_{WRL}$ and $V_{WRR}$ computed at step S1. The highest wheel-speed $V_{WH}$, often called a select-HIGH wheel speed, may be directly used as the pseudo vehicle speed Vc. Alternatively, the select-HIGH wheel speed $V_{WH}$ may be further processed through a predetermined filtering process, and the wheel speed processed through the predetermined filtering process may be used as the vehicle speed Vc for the purpose of calculation of the respective slip ratios Si (i=FL, FR, RL, RR). Furthermore, a pseudo vehicle speed Vc may be computed by adding an integrated value of a longitudinal acceleration exerted on the vehicle to the select-HIGH wheel speed $V_{WH}$. In this case the system may further require a longitudinal acceleration sensor mounted on the vehicle body. In step S3, four acceleration/deceleration indicative data $V'_{WFL}$, $V'_{WFR}$, $V'_{WRL}$, and $V'_{WRR}$ are computed by differentiating the respective wheel-speed data computed ($V_{WFL}$, $V_{WFR}$, $V_{WRL}$ and $V_{WRR}$). If the sign of the acceleration/deceleration indicative data is a plus (+) sign, this data represents a positive acceleration (simply an acceleration). If the sign of the acceleration/deceleration indicative data is a minus (−) sign, this data represents a negative acceleration (that is, a deceleration). In step S4, four slip-ratio indicative data Si (i=FL, FR, RL, RR) are computed on the basis of the pseudo vehicle speed Vc (determined through step S2) and the respective wheel-speed data Vwi (i=FL, FR, RL, RR), from the following expression (1).

$$Si=\{(Vc-Vwi)/Vc\}\times 100 \qquad (1)$$

Figure 6:
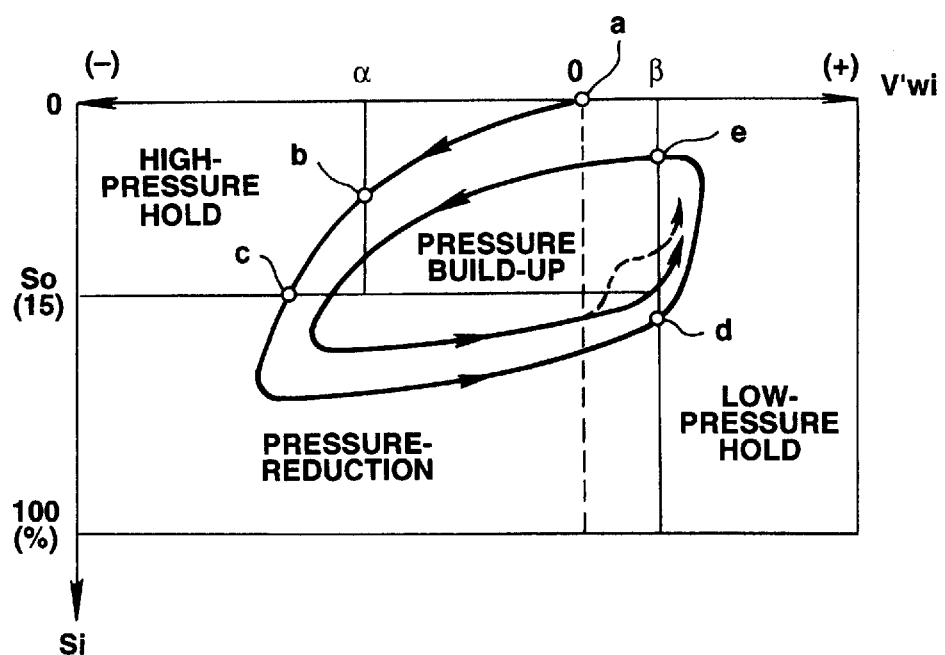
FIG. 6 shows a control map of the ABS.

After step S4, step S5 proceeds in which an anti-lock brake control (simply a skid control) is executed on the basis of comparison results of each of the slip-ratio indicative data Si with a predetermined target slip ratio So (corresponding to an ideal slip ratio such as 15%) and on the basis of comparison results of each of the acceleration/deceleration indicative data V'wi with a predetermined threshold $\beta$ for an acceleration and a predetermined threshold $\alpha$ for a deceleration. The threshold $\beta$ will be hereinbelow referred to as an "acceleration threshold", whereas the threshold $\alpha$ will be hereinbelow referred to as a "deceleration threshold". Actually, the skid control executed at step S5 is based on the control map shown in FIG. 6. When the brakes are released without any depression of the brake pedal and additionally a flag FS, indicating whether the anti-lock brake control system is in operative or in inoperative, is reset to zero, no exciting current flows across each of the solenoids SL. Thus the system permits normal application of the brakes. The controller determines on the basis of the signal level of the signal from the brake lamp switch 8a, whether the brakes are released (during no-braking) or applied (during braking) In other words, when the ABS is in inoperative and thus the flag FS is zero, the respective wheel-brake cylinder is operated at a so-called rapid pressure build-up mode. The flag FS will be hereinafter referred to as a "skid-control state indicative flag". When the brakes are applied and also the slip ratio data Si of either one of the four wheels exceeds the predetermined target slip ratio So such as 15%, the wheel-cylinder pressure of the wheel-brake cylinder selected for the skid control is adjusted according to the pressure reduction mode. At the same time, the skid-control state indicative flag FS is set at "1" and additionally the motor driving signal $S_M$ of a high signal level is output to the transistor 24. Owing to the pressure reducing action to the wheel-brake cylinder selected for the purpose of skid control, the acceleration/ deceleration indicative data V'wi exceeds the predetermined acceleration threshold $\beta$, the control mode is shifted from the pressure reduction mode to the low-pressure hold mode. As a result of this, if the slip ratio indicative data Si of the wheel which is subjected to the skid control becomes less than the target slip ratio So and the acceleration/deceleration indicative data V'wi becomes less than the predetermined acceleration threshold $\beta$, a so-called moderate pressure build-up mode begins to adjust again the slip ratio Si towards the target slip ratio So. Thereafter, if the acceleration/ deceleration indicative data V'wi becomes less than the predetermined deceleration threshold $\alpha$, the high-pressure hold mode initiates. During the skid control at the high-pressure hold mode, when the slip ratio indicative data Si exceeds again the predetermined target slip ratio So, the pressure reduction mode starts again. In the skid-control map indicated in FIG. 6, the point a essentially corresponds to a starting point of the braking action, the point b essentially corresponds to a shifting point from the rapid pressure build-up mode to the high-pressure hold mode, the point C essentially corresponds to a shifting point from the high-pressure hold mode to the pressure reduction mode. On the other hand, the point d essentially corresponds to a shifting point from the pressure reduction mode to the low-pressure hold mode, and the point e essentially corresponds to a shifting point from the low-pressure hold mode to the moderate pressure build-up mode. In this manner, the slip ratio Si can be converged on the target slip ratio So and the acceleration/deceleration indicative data V'wi can also be adjusted toward a value less than the acceleration threshold $\beta$ and greater than the deceleration threshold $\alpha$ by way of repetitions of the moderate pressure build-up mode, the high-pressure hold mode, the pressure reduction mode and the low-pressure hold mode. After this, when a predetermined skid-control termination condition (for example a condition wherein the brake pedal 8 becomes released or a condition wherein a signal level from the brake lamp switch 8a is shifted to a low level) is satisfied, the skid-control state indicative flag FS is reset again to "0", and thus the system permits normal application of the brakes. In FIG. 5, a flag FD denotes a pressurereduction mode indicative flag. For example when the front-left wheel-brake cylinder 6FL is controlled at the pressure-reduction mode, the pressure-reduction mode indicative flag $FD_{FL}$ associated with the front-left wheel 1FL is set at "1". When shifting from the pressure-reduction mode to the other control modes, the pressure-reduction mode indicative flag $FD_{FL}$ is reset. The pressure-reduction mode indicative flags $FD_{FL}$, $FD_{FR}$, $FD_{RL}$ and $FD_{RR}$ associated with the respective wheels 1FL, 1FR, 1RL and 1RR will be hereinbelow represented by the character FDi as generally referred to. Similarly, the skid-control indicative flag $FS_{FL}$ is correlated to the beginning of the skid control of the front-left road wheel 1FL. The skid-control indicative flags $FS_{FL}$, $FS_{FR}$, $FS_{RL}$ and $FS_{RR}$ associated with the respective wheels 1FL, 1FR, 1RL and 1RR will be hereinbelow represented by the character FSi as generally referred to. The previously-noted solenoid drive circuit 26i (i=FL, FR, RL, RR) actually regulates or adjusts or controls a signal level of the pressure-hold indicative signal HSi and a signal level of the pressure-reduction indicative signal DSi, as follows.

During the skid control at the moderate pressure build-up mode, the pressure-reduction indicative signal DSi is kept at a logical value "0", while the pressure-hold indicative signal HSi is cyclically alternated between a logical value "0" and a logical value "1". The alternation of the two different logical values "0" and "1" permits the solenoid drive circuit 26i to intermittently output the exciting current Ii of a predetermined medium current value. As may be appreciated, the intermittent output of the exciting current from the solenoid drive circuit causes the solenoid valve 12i to alternate between the pressure build-up position and the pressure-hold position. This results in a stepwise increase in the brake-fluid pressure in the wheel-brake cylinder 6i (i=FL, FR, RL, RR). During the skid control at the pressure-hold mode, the pressure-reduction indicative signal DSi is kept at a logical value "0", while the pressure-hold indicative signal HSi is kept at a logical value "1". In this case, the solenoid drive circuit 26i continuously outputs the exciting current Ii of the predetermined medium current value, thus maintaining the solenoid valve 12i at the pressure-hold position and thereby the brake-fluid pressure in the wheel-brake cylinder is kept almost constant. During the skid control at the pressure-reduction mode, the pressure-reduction indicative signal DSi is kept at a logical value "1", while the pressure-hold indicative signal HSi is kept at a logical value "0". In this case, the solenoid drive circuit 26i continuously outputs the exciting current Ii of the predetermined high current value, thus maintaining the solenoid valve 12i at the pressure-reduction position and thereby the brake-fluid pressure in the wheel-brake cylinder is gradually reduced with the brake-fluid flow towards the reservoir tank 17F and/or 17R. Returning to the flow chart shown in FIG. 5, in step S6 a test is made to determine whether the skid-control state indicative flag FS (FSi) is set at "1". When the answer to step S6 is negative (NO), i.e., in case of FS=0, the time-triggered sub-routine terminates. Conversely when the answer to step S6 is affirmative (YES), i.e., In case of FS=1, step S7 proceeds in which a test is made to determine whether the electric motor 15 is under an abnormal condition or a normal condition. The test of step S7 is based on the value of the voltage signal VM from the voltage detection circuit 27. As previously discussed, if the voltage signal VM is a high voltage level, step S7 determines that the motor coil is not broken and the motor wire connected is not loose and thus the motor operates normally. Thus, when the answer to step S7 is affirmative, the current interrupt routine terminates. On the contrary when the voltage signal VM is a low level, step S7 determines that the motor coil is broken or there is a loose motor wire connector and thus the motor is under the abnormal condition. When the answer to step S7 is negative, i.e., the motor is in trouble, step S8 enters in which a test is made to determine whether or not the pressure-reduction mode indicative flag FD (FDi) is set. In case that the flag FD is reset ("0"), the interrupt routine terminates. In case that the flag FD is set ("1"), step S9 proceeds in which a counted value ti (i=FL, FR, RL, RR) of a pressure-reduction timer is incremented by "1" and also the counted value ti of the timer is updated with the newly incremented counted value. Thereafter, step S10 proceeds in which a counted value tF of a front-wheel side pressure-reduction timer is computed by adding a counted value tFL of the front-left wheel pressure-reduction timer to a counted value tFR of the front-right wheel pressure-reduction timer, and additionally a counted value tR of a rear-wheel side pressure-reduction timer is computed by adding a counted value tRL of the rear-left wheel pressure-reduction timer to a counted value tRR of the rear-right wheel pressure-reduction timer. The counted value tF of the front-wheel side pressure-reduction timer is regarded as an integrated value of time intervals (or time durations) for which the system is in the pressure-reduction mode with regard to the front wheel-brake cylinders 16FL and 16FR, because the amount of brake fluid temporarily stored in the reservoir tank 17F increases substantially in proportion to the counted value tF of the timer. Likewise, the counted value tR of the rear-wheel side pressure-reduction timer is regarded as an integrated value of time intervals for which the system is in the pressure-reduction mode with regard to the rear wheel-brake cylinders 16RL and 16RR. The procedure flows from step S10 to step S11 in which a test is made to determine whether the counted value tF of the front-wheel side pressure-reduction timer reaches a preset time tAF correlated with the capacity of the reservoir tank 17F storing the brake fluid exhausted away from the two front wheel-brake cylinders 6FL and 6FR. When the counted value tF does not yet reach the preset time tAF, i.e., in case of tF<tAF, the controller determines that it is possible to further store the brake fluid into the reservoir tank 17F, and then the procedure flows from step S11 to step S15. In step S15 a test is made to determine whether the counted value tR of the rear-wheel side pressure-reduction timer reaches a preset time tAR correlated with the capacity of the reservoir tank 17R storing the brake fluid exhausted away from the two rear wheel-brake cylinders 6RL and 6RR. When the answer to step S15 is negative, i.e., in case of tR<tAR, the interrupt routine terminates. Conversely when the answer to step S15 is affirmative, i.e., in case of tR=tAR, step S12 enters in which the four pressure-reduction indicative signal DSi (i=FL, FR, RL, RR) and the four pressure-hold indicative signal HSi (i=FL, FR, RL, RR) are all set at a logical value "0". As a result the solenoid valves are all set at their pressure build-up positions. At the same time, the flag FS is reset. Thereafter step S13 enters in which the motor control signal SM and the actuator control signal SA are both shifted to a low signal level. As a result of step S13, the motor relay 28 and the actuator relay 31 are both switched OFF with the transistors 24 and 25 both turned OFF. Thus, the electric motor 15 and the solenoids SL of the solenoid valves 12FL through 12RR are all de-energized. In step S14, the microcomputer 23 outputs the warning signal SD of a logical value "1" to the warning indicating circuit 32, with the result that the warning indicator lamp may be flashed on and off and/or the warning buzzer may sound an alarm. In this manner, a series of skid control procedures end.

Referring now to FIGS. 7A to 7G, there are shown simulation results which were obtained by executing the sub-routine of FIG. 5. The simulation results shown in FIGS. 7A to 7G are based on the assumption that the skid control first starts at the front road wheels but not at the rear road wheels because the exemplified vehicle is the rear-wheel-drive vehicle and thus the front driven wheels generally tend to skid earlier than the rear drive wheels during braking operation, and from the viewpoint of driving stability and controllability of the vehicle automotive brakes are generally designed so that the front road wheels reach the skidding point earlier than the rear road wheels and the front-end skid takes place first. For the purpose of easy understanding and simplification of the disclosure, this simulation is also made on the assumption that the front-left and front-right road wheels 1FL and 1FR are accelerated and decelerated in synchronization with each other, and the vehicle travels at a constant speed with the brakes released until the time t1. Additionally, suppose that the motor is in trouble, for example the motor wire connector is disconnected or the motor coil is broken, all during the simulation period. Under these conditions, through step S5 of the interrupt routine of FIG. 5 executed before the time t1, the skid-control state indicative flag FS remains reset at "0", and additionally the pressure-reduction indicative signals DS$_i$ (i=FL, FR, RL, RR) and the pressure-hold indicative signals HS$_i$ (i=FL, FR, RL, RR) are all set at a logical value "0". The solenoid valves 12FL and 12FR included in the front-wheel side hydraulic actuator 10F and the solenoid valves 12RL and 12RR included in the rear-wheel side hydraulic actuator 10R are all kept at their pressure build-up positions. Therefore, the fluid connection between the master cylinder 9 and the respective wheel-brake cylinder (6FL through 6RR) is established. However, since the brakes are released until the time t1, the master-cylinder pressure is almost zero, no-braking condition continues until the time t1. When shifting from the constant-speed, straight-ahead driving condition to the braking condition at the time t1, the master-cylinder pressure rises rapidly owing to depression of the brake pedal 8. As seen in FIG. 7C, the brake-fluid pressures of the wheel-brake cylinders associated with the front road wheels rise rapidly from the time t1, since the solenoid valves 12$i$ remain at their pressure build-up positions. As seen in FIG. 7A, the front-left wheel speed V$_{WFL}$ and the front-right wheel speed V$_{WFR}$ begin to decrease from the time t1, owing to the rapid increase in the brake-fluid pressure within each of the front wheel-brake cylinders 6FL and 6FR. Suppose that the front-left and front-right wheel acceleration/deceleration indicative data V'$_{WFL}$ and V'$_{WFR}$ become less than the predetermined deceleration threshold α at the time t2, as indicated by the shifting point b of FIG. 6. According to the skid control of step S5 shown in FIG. 5, the controller inhibits normal braking, and switches the brake-fluid control mode with regard to the respective front road wheel 1FL and 1FR from the pressure build-up mode to the high-pressure hold mode. Concretely, the output interface circuit 23$d$ of the microcomputer 23 generates two pressure-hold indicative signals HS$_{FL}$ and HS$_{FR}$ each having a logical value "1" to the solenoid drive circuits 26FL and 26FR with the pressure-reduction indicative signals DS$_{FL}$ and DS$_{FR}$ remaining low (at a logical value "0"). As seen in FIG. 7B, the exciting currents I$_{FL}$ and I$_{FR}$, each having the predetermined medium current value, flow across the solenoids SL of the front-wheel side solenoid valves 12FL and 12FR, so as to shift them to their pressure-hold positions. Therefore, as seen in FIG. 7C, the front wheel-brake cylinder pressure is held at a comparatively high-pressure level for a while from the time t2. Suppose that the respective slip-ratio indicative data S$_{FL}$ and S$_{FR}$ exceed the target slip ratio S$_0$ at the time t3, as indicated by the shifting point c of FIG. 6. The controller 21 switches the control mode from the pressure-hold mode to the pressure-reduction mode by switching the pressure-reduction indicative signals DS$_{FL}$ and DS$_{FR}$ to a logical value "1" and by switching the pressure-hold indicative signals HS$_{FL}$ and HS$_{FR}$ to a logical value "0". Thus, as shown in FIG. 7B, the exciting currents I$_{FL}$ and I$_{FR}$, each having the predetermined high current value, flow across the solenoids of the solenoid valves 12FL and 12FR, with the result that these valves 12FL and 12FR are shifted to their pressure-reduction positions. As a consequence, the front wheel-brake cylinders 6FL and 6FR are communicated with the reservoir tank 17F through the return line 14$r$. The brake-fluid within the wheel-brake cylinders 6FL and 6FR flows through the return line 14$r$ into the reservoir tank 17F moderately owing to the bias of the return spring 17$a$. As explained above, when the pressure-reduction mode is selected, the skid-control state indicative flag FS and the pressure-reduction mode indicative flag FD are both set at "1". Simultaneously, the motor control signal S$_M$ of a high signal level is output from the output interface circuit 23$d$ to the transistor 24. The transistor 24 is turned ON and thus the motor relay 28 is switched ON. Note that the electric motor 15 of the return pump is not driven owing to the motor trouble such as the loose motor wire connector, although the motor relay 28 is switched ON. After the skid control executed at step S5, the procedure of the interrupt routine shown in FIG. 5 advances to step S7 via step S6, because of the flag FS set. As previously discussed, assuming that the voltage signal V$_M$ from the output terminal of the voltage detection circuit 27 remains low (such as a logical value "0") from the beginning of the simulation to the end of the simulation, as indicated by the solid line (zero-voltage line) in FIG. 7E, the procedure flows from step S7 to step S8, since the motor is abnormal or faulty owing to the motor wire connector disconnected for example. In FIG. 7E, the broken line indicates the voltage signal V$_M$ of a high signal level (such as a logical value "1") which may be detected when the motor operates normally. Next, the procedure flows to step S9, since the pressure-reduction mode indicative flag FD has been set at "1". In step S9, the counted values t$_{FL}$ and t$_{FR}$ of the pressure-reduction timers associated with the front wheel-brake cylinders 6FL and 6FR are incremented by "1". Then step S10 begins to compute the counted value t$_F$ of the front-wheel side pressure-reduction timer as the sum of the two counted values t$_{FL}$ and t$_{FR}$ of the front-left and front-right wheel pressure-reduction timers. As a result of this, during the skid control at the pressure-reduction mode, as appreciated from the time period between t3 and t4 in FIG. 7F, the counted value t$_F$ of the timer increases essentially in a linear fashion. Actually, since the motor 15 is not driven due to the motor trouble such as the motor wire connector disconnected, the brake fluid within the reservoir tank 17F is not exhausted towards the inlet of the return pump 16. Thus the brake fluid (exhausted from the front wheel-brake cylinders and directed to the return line 14$r$ through the return ports 12$r$ of the two solenoid valves 12FL and 12FR) forces the piston 17$b$ to move inwards against the bias of the spring 17$a$ and is temporarily stored in the reservoir tank 17F. Thereby the amount of brake fluid in the reservoir tank 17F gradually increases during the skid control at the pressure-reduction mode (see the time period between t3 and t4 in FIG. 7D). Suppose that the front wheel speeds V$_{WFL}$ and V$_{WFR}$ begin to increase again just before the time t4 owing to the pressure reducing action with respect to the front wheel-brake cylinders 6FL and 6FR. Also, suppose that the front wheel acceleration/deceleration indicative data V'$_{WFL}$ and V'$_{WFR}$ exceed the predetermined acceleration threshold β at the time t4, as indicated by the shifting point d in FIG. 6. On the above-mentioned supposition, the controller switches the control mode from the pressure reduction mode to the low-pressure hold mode through the skid-control routine of step S5 of FIG. 5. As a result, the solenoid valves 12FL and 12FR associated with the front wheel-brake cylinders are shifted from their pressure-reduction positions to their pressure-hold positions. As soon as the pressure hold mode is selected by the controller, the pressure-reduction mode indicative flags FD$_{FL}$ and FD$_{FR}$ are reset to "0", and then the interrupt routine of FIG. 5 terminates after step S8. Therefore, for the time period (between t4 and t5) of the pressure hold mode, the counted value tF of the front-wheel side pressure-reduction timer is not incremented and remains at the previous value. Also, the solenoid valves 12FL and 12FR are both kept at their pressure-hold positions in the pressure-hold mode and serve to block the fluid connection between the front wheel-brake cylinders 6FL and 6FR and the return line 14r (or the reservoir tank 17F). Thus, the amount of brake fluid stored within the reservoir tank 17F is maintained substantially at the previous amount, as seen in FIG. 7D (see the time period between t4 and t5). Owing to this low-pressure hold mode, the brake-fluid pressures of the front wheel-brake cylinders 16FL and 16FR are kept at a comparatively low pressure level as appreciated from the time interval t4 and t5 of FIG. 7C. Thus the front wheel speeds V$_{WFL}$ and V$_{WFR}$ recovers greatly near the time t5 and then approaches to a speed nearly equal to the pseudo vehicle speed Vc. As a result of this, assuming that the two acceleration/deceleration indicative data V'$_{WFL}$ and V'$_{WFR}$ become less than the predetermined acceleration threshold β at the time t5, as indicated by the shifting point e of the control map shown in FIG. 6, the control mode for the respective front wheel-brake cylinder is shifted to the so-called moderate pressure build-up mode. In such a moderate pressure build-up mode, as previously explained, only the pressure-hold indicative signals HS$_{FL}$ and HS$_{FR}$ are cyclically alternated between two different logical values namely "0" and "1", whereas the pressure-reduction indicative signals DS$_{FL}$ and DS$_{FR}$ remains low (at a logical value "0"). As a result, the brake-fluid pressures within the front wheel-brake cylinders 16FL and 16FR increase in a stepwise manner for a while from the time t5 (see the time duration between t5 and t6 in FIG. 7C). On the other hand, the front wheel speeds V$_{WFL}$ and V$_{WFR}$ reach a maximal value between t5 and t6, and then begin to reduce. Thereafter, suppose that the two acceleration/deceleration indicative data V'$_{WFL}$ and V'$_{WFR}$ become less than the predetermined deceleration threshold α at the time t6. During operation at the previously-noted moderate pressure build-up mode (corresponding to the time interval between t5 and t6), there is less change in the amount of brake fluid in the reservoir tank 17F, since there is no fluid connection between the respective front wheel-brake cylinder 16FL and 16FR and the return line 14r. At the time t6, the controller shifts again the control mode from the moderate pressure build-up mode to the high-pressure hold mode. In this high-pressure hold mode, as appreciated from the time period between t6 and t7 in FIGS. 7C, 7D and 7F, the brake-fluid pressures in the wheel-brake cylinders 16FL and 16FR, the amount of brake fluid in the reservoir tank 17F, and the counted value tF of the reduction-pressure timer all remain unchanged. After this, as soon as the slip-ratio data S$_{FL}$ and S$_{FR}$ of the front road wheels exceed again the target slip ratio So at the time t7, the controller switches the control mode from the high-pressure hold mode to the pressure-reduction mode. In the same manner as the time t3, the system executes the pressure-reduction mode from the time t7. That is, the exciting currents I$_{FL}$ and I$_{FR}$ are held at the predetermined high current value with the pressure-reduction indicative signals DS$_{FL}$ and DS$_{FR}$ set at the logical value "1", and as a result the solenoid valves 12FL and 12FR are moved toward their pressure-reduction positions. Thus, the brake-fluid pressures in the two wheel-brake cylinders 16FL and 16FR begin to reduce essentially in a linear fashion from the time t7. The amount of brake fluid within the reservoir tank 17F increases owing to the flow from the wheel cylinders 16FL and 16FR via the solenoid valves 12FL and 12FR to the return line 14r. On the other hand, the counted value tF of the timer increases for the time duration from the time t7 to the time t8 (t8 corresponding to a shifting point from the pressure-reduction mode to the low-pressure hold mode), but does not still reach the preset time tAF at the time t8. Thus, the interrupt routine flows from step S11 to step S15, and then terminates. At the time t8, the control mode is shifted to the low-pressure hold mode. Thereafter, similarly to the time period between t5 and t7, the control mode is shifted to the moderate pressure build-up mode at the time t9, to the high-pressure hold mode at the time t10, and to the pressure-reduction mode at the time t11. As soon as the pressure-reduction mode is selected at the time t11, the counted value tF of the timer begins to increase again. Then the counted value tF reaches the preset time tAF just at the time t12. As may be appreciated from the fact that the charts shown in FIGS. 7D and 7F are almost similar figures, the preset time tAF of the timer is determined depending on a volumetric capacity of the front-wheel side reservoir tank 17F, whereas the preset time tAR of the timer is determined depending on a volumetric capacity of the rear-wheel side reservoir tank 17R. In the shown embodiment, the preset time tAF of the timer is timed or adjusted so that the front-wheel side reservoir tank 17F is filled to the full capacity (or a predetermined capacity) with the brake fluid exhausted away from the front wheel-brake cylinders 16FL and 16FR when the preset time tAF is reached during the skid control made with regard to the front road wheels, with the electric motor 15 in inoperative due to the motor trouble such as the motor wire connector disconnected or the motor coil burnt out. Similarly, the preset time tAR of the timer is adjusted so that the rear-wheel side reservoir tank 17R is filled to the full capacity with the brake fluid exhausted away from the rear wheel-brake cylinders 16RL and 16RR when the preset time tAR is reached during the skid control made with regard to the rear road wheels, with the electric motor 15 in inoperative due to the motor trouble. When the interrupt routine shown in FIG. 5 is executed just after the time t12, the procedure flows from step S11 to step S12, and thus the pressure-reduction indicative signals DS$_{FL}$ through DS$_{RR}$ and the pressure-hold indicative signals HS$_{FL}$ through HS$_{RR}$ are all shifted to a logical value "0". No exciting current Ii (i=FL, FR, RL, RR) can be output from the solenoid drive circuit 26i after the time t12, as seen in FIG. 7B. Then the actuator control signal S$_A$ from the output interface circuit 23d is shifted to a low signal level through step S13, so as to turn the transistor 25 off and consequently to switch the actuator relay 31 off (see the time t12 in FIG. 7G). As a result, no current can flow across the solenoid SL of the solenoid valve 12i after the time t12. In this manner, at the time t12 the system terminates the anti-lock brake control and permits normal application of the brakes. Subsequently, the output interface circuit 23d outputs the warning signal S$_D$ to the warning indicating circuit 32 through step S14 to activate it, with the result that the warning indicator lamp is flashed on and off and/or the warning buzzer emits a buzzing sound to warn the driver (or the vehicle occupants) that the motor of the ABS pump is faulty and does not operate normally. Above-discussed by reference to the timing charts shown in FIGS. 7A–7G area series of skid-control procedures related to the front driven wheels 1FL and 1FR. A series of skid-control procedures of the rear-road wheels 1RL and 1RR are executed according to the arithmetic processing of FIG. 5, almost in the same way as the front road wheels. However, since the rear road wheels correspond to drive wheels, the rear-wheel speed VWRL and VWRR tend to decrease moderately slowly during braking as compared with the front driven wheels. In other words, the counted value tR of the rear-wheel side timer generally tends to reach the preset time tAR with a time lag from the time when the counted value tF of the front-wheel side timer has been reached the preset time tAF. Therefore, the actuator relay 31 is usually switched off at the timing when the preset time tAF is first reached before the preset time tAR is reached, and thereafter the skid control for the rear wheels terminates soon. In the event that the counted value tR of the rear-wheel side timer reaches the preset time tAR for some reason or some cause before the preset time tAF is reached, the flow proceeds to step S12 via step S15, and then advances to step S13 and to step S14. Thus, the actuator relay 31 is switched off with the actuator control signal SA shifted to the low signal level, and additionally the warning indicating circuit 32 is activated to flash on and off the warning indicator lamp and/or to emit a buzzing sound. In this manner, the skid control of the rear drive wheels terminates.

As set forth above, according to the anti-brake control system of the embodiment (the arithmetic processing of FIG. 5), when the skid control begins and simultaneously the skid-control state indicative flag FS is set after the brakes are applied, first the system makes a diagnosis on the motor trouble (see step S7 of FIG. 5). Then if the system determines that the motor of the return pump does not run normally and thus the motor is in trouble, the system functions to effectively continue the skid control until the counted value tF of the reduction-pressure timer of the front wheel side reaches the preset time tAF or the front-wheel side reservoir tank 17F is filled to the full capacity with the brake fluid exhausted away from the front wheel-brake cylinders. As a consequence, the anti-lock brake control system of the invention can prevent a rapid transition from skid control to normal braking and permit a moderate transition to normal application of the brakes, while hitherto a prior art skid control system would perform a rapid transition from skid control to normal braking at the same time when the abnormality of the motor (or the motor trouble) is determined, or with a predetermined brief time lag such as 0.1 sec from the time when the abnormality of the motor is determined. As can be appreciated from the above, even in the presence of motor trouble of an electric motor of a return pump (an ABS pump), the anti-lock brake control system of the invention can effectively continue the skid control and thereby the skidding wheels are assumed to have adequate traction to stop the skid, often called "deceleration slips". This enhances the driving stability of the vehicle and greatly improve the braking performance during skid control in the presence of motor trouble of the return pump.

Figure 8:
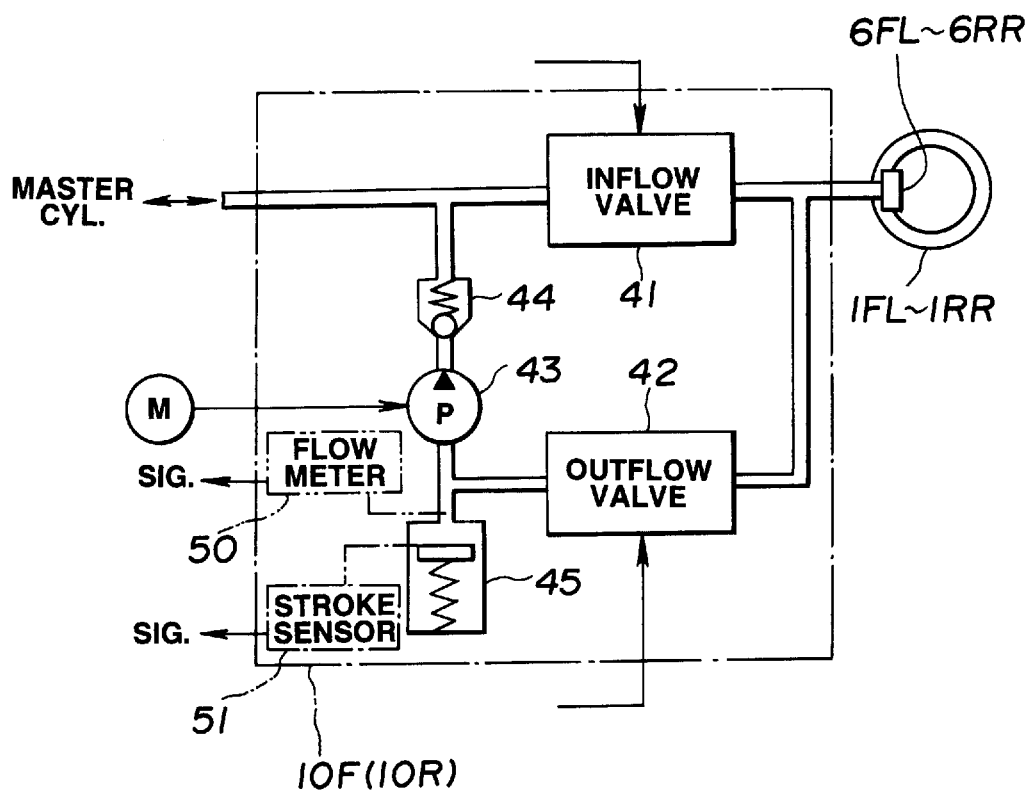
FIG. 8 is a schematic hydraulic system diagram illustrating another hydraulic actuator being usable for the ABS shown in FIG. 1.

Although the previously-discussed anti-lock brake control system is embodied in case of the rear-wheel-drive vehicle, it will be appreciated that the system of the invention may be applicable to a front-wheel-drive vehicle. In the shown embodiment, although the four separate three-port, three-position electromagnetic solenoid valves 12FL through 12RR are adapted to the respective wheel-brake cylinders 6FL through 6RR, the fluid pressure in the front-left wheel-brake cylinder 6FL may be adjusted in common with the fluid pressure in the front-right wheel-brake cylinder 6FR by way of only one three-port, three-position electromagnetic solenoid valve, while the fluid pressure in the rear-left wheel-brake cylinder 6RL may be adjusted in common with the fluid pressure in the rear-right wheel-brake cylinder 6RR by way of another three-port, three-position electromagnetic solenoid valve. Furthermore, as shown in FIG. 8, a set of two-port, two-position inflow and outflow valves 41 and 42 may be used in lieu of the three-port, three-position solenoid valve. Assuming that the inflow and outflow valves 41 and 42 are used, it is preferable that a return pump 43, a one-way check valve 44 and a reservoir tank 45 are provided as seen in FIG. 8. As may be appreciated, the circuit shown in FIG. 8 operates as follows. In the pressure build-up mode, the inflow valve is fully opened whereas the outflow valve is shut off, and thus the circuit permits the flow of brake fluid from the master cylinder via the inflow valve 41 to the wheel-brake brake cylinder. On the contrary, during the skid control at the pressure-reduction mode, the inflow valve 41 is shut off and the outflow valve 42 is opened fully, and thus the circuit permits the flow from the wheel-brake cylinder via the outflow valve 42 to the reservoir tank 45. In the pressure hold mode, the two valves 41 and 42 must be shut off in response to control signals from the controller.

Moreover, in the shown embodiment, the self-diagnosis (the motor-trouble diagnosis) is initiated at step S7 after the anti-lock brake control procedure executed at step S5. Alternatively, the trouble diagnosis may be made when the ignition switch is turned on, and thereafter this diagnostic result may be utilized at step S7 when the interrupt routine of FIG. 5 is executed. In the shown embodiment, the front-left and front-right wheel-brake cylinders 6FL and 6FR are properly connected to or disconnected from the front-wheel side reservoir tank 17F during the skid control of the front road wheels, while the rear-left and rear-right wheel-brake cylinders 6RL and 6RR are properly connected to or disconnected from the rear-wheel side reservoir tank 17R during the skid control of the rear road wheels. In lieu thereof, a so-called longitudinal fluid connection may be provided so that the front-left and rear-left wheel-brake cylinders 6FL and 6RL are connected to or disconnected from one reservoir tank, and so that the front-right and rear-right wheel-brake cylinders 6FR and 6RR are connected to or disconnected from another reservoir tank. Alternatively, a so-called diagonal fluid connection may be provided so that one pair of diagonal wheel-brake cylinders, installed on the vehicle on one diagonal line of the vehicle, are connected to or disconnected from one reservoir tank, and so that another pair of diagonal wheel-brake cylinders, installed on the vehicle on the other diagonal line of the vehicle, are connected to or disconnected from the other reservoir tank. In case of the previously-noted longitudinal fluid connection or the diagonal fluid connection, it is preferable to compute an integrated value of time intervals of pressure-reduction modes, which may take place intermittently during the skid control, every wheel-brake cylinders 6FL–6RR. The previously-noted integrated value is obtained as a counted value of a timer. In lieu thereof, as indicated by the two-dotted line in FIG. 8, a volumetric flow of the brake fluid flowing into the reservoir tank may be measured by means of a flow meter 50 which is fluidly disposed in the port of each of the reservoir tanks. That is, the amount of brake fluid stored in the reservoir tank may be estimated by way of the processor by integrating the volumetric flow measured. In another, for the purpose of more accurately detecting or monitoring the amount of brake fluid stored in the reservoir tank, as indicated by the phantom line in FIG. 8, the inward stroke (the downstroke, viewing FIG. 2) of the piston 17b of the reservoir tank may be directly detected by a stroke sensing device for example a stroke sensor 51. In such a case, the skid control can be continued accurately up to the time when the reservoir tank is just filled to the full capacity, and thus the time duration of the anti-lock brake control can be more accurately timed to terminate only when the reservoir tank is completely filled to the full capacity.

Figure 9:
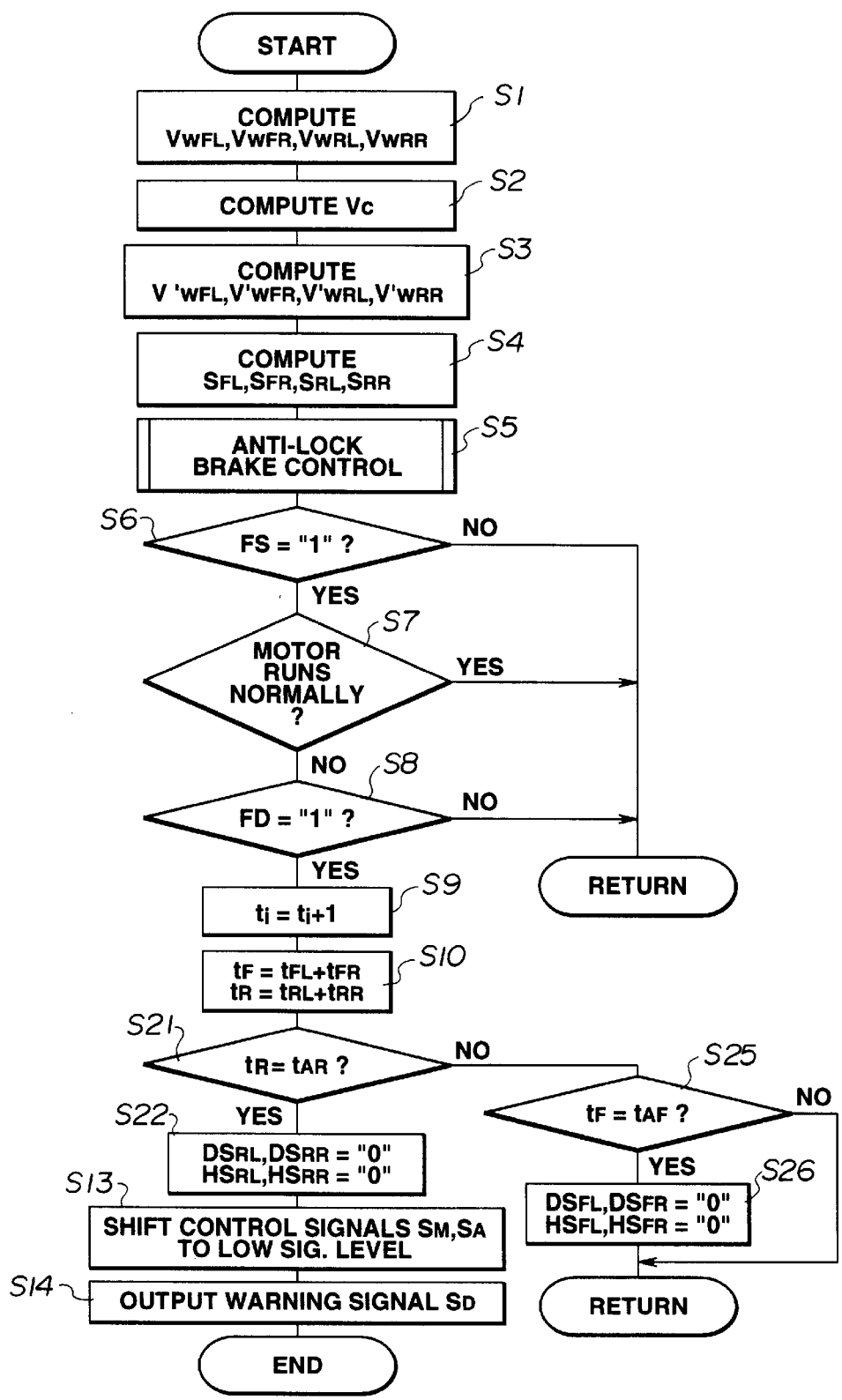
FIG. 9 is a flow chart illustrating another example of a sub-routine (a control procedure) executed by a microcomputer employed in the control circuit shown in FIG. 3.

Referring now to FIG. 9, there is shown a modified arithmetic processing executed by the processor 23b of the microcomputer 23 employed in the controller 21. The modified arithmetic processing shown in FIG. 9 is also executed as time-triggered interrupt routines to be triggered every predetermined time intervals such as 10 msec. The modified arithmetic processing of FIG. 9 is similar to the arithmetic processing of FIG. 5, except that steps S11, S12 and S15 included in the routine shown in FIG. 5 are replaced with steps S21, S22, S25 and S26 included in the routine shown in FIG. 9. Thus, the same step numbers used to designate steps in the routine shown in FIG. 5 will be applied to the corresponding step numbers used in the modified arithmetic processing shown in FIG. 9, for the purpose of comparison of the two different interrupt routines. Steps S21, S22, S25 and S26 will be hereinafter described in detail with reference to the accompanying drawings, while detailed description of steps S1 through S10, S13 and S14 will be omitted because the above description thereon seems to be self-explanatory.

As seen in FIG. 9, note that a test (step S21) made to decide whether the counted value tR of the rear-wheel side pressure-reduction timer reaches the preset time tAR is placed before a test (step S25) made to decide whether the counted value tF of the front-wheel side pressure-reduction timer reaches the preset time tAF. Additionally, only when the counted value tR reaches the preset time tAR, i.e., in case of tR=tAR, the flow proceeds from step S21 to step S22 in which the pressure-reduction indicative signals DSRL and DSRR and the pressure-hold indicative signals HSRL and HSRR, all associated with the solenoid drive circuits 26RL and 26RR of the rear-wheel side, are shifted to a logical value "0". Only when the counted value tF reaches the preset time tAF, i.e., in case of tF=tAF, the flow proceeds from step S25 to step S26 in which the pressure-reduction indicative signals DSFL and DSFR and the pressure-hold indicative signals HSFL and HSFR, all associated with the solenoid drive circuits 26FL and 26FR of the front-wheel side, are shifted to a logical value "0". That is, the skid control of the rear-wheel side and the skid control of the. front-wheel side are terminated separately depending upon the respective counted values tR and tF. To the contrary, in the case of the routine (see steps S11, S12 and S15) shown in FIG. 5, the skid control of the front-wheel side and the skid control of the rear-wheel side are both terminated simultaneously when the counted value tF reaches the preset time tAF or the counted value tR reaches the preset time tAR.

Referring now to FIGS. 10A to 10G, there are shown simulation results which were obtained by executing the routine of FIG. 9. In addition to the assumption of the simulation shown in FIGS. 7A–7G, the simulation results shown in FIGS. 10A–10G are based on the assumption that the rear-left and rear-right road wheels 1RL and 1RR are accelerated and decelerated in synchronization with each other.

As appreciated, variations (shown in FIG. 10B) in the exciting currents IFL and IFR flowing across the front-wheel side solenoid valves are similar to those shown in FIG. 7B.

That is, the high-pressure hold mode is set when the front-left and front-right wheel acceleration/deceleration indicative data V'WFL and V'WFR become less than the predetermined deceleration threshold α at the time t2 after the brakes are applied at the time t1. Thereafter, the two slip-ratio indicative data SFL and SFR exceed the target slip ratio So at the time t3, the pressure-reduction mode is selected and thus the skid-control indicative flag FSi (i=FL, FR) is set. When the wheel acceleration/deceleration indicative data V'WFL and V'WFR exceed the predetermined acceleration threshold β at the time t4, the control mode for the front-wheel side is shifted from the pressure reduction mode to the low-pressure hold mode. When the acceleration/deceleration indicative data V'WFL and V'WFR become less than the predetermined acceleration threshold β at the time t7, the moderate pressure build-up mode is selected and continues up to the time t9. As soon as the acceleration/deceleration indicative data V'WFL and V'WFR become less than the predetermined deceleration threshold α at the time t9, the control mode for the front-wheel side is shifted to the high-pressure hold mode. Thereafter, repeated are the pressure-reduction mode (see the time interval between t11 and t12), the low-pressure hold mode (see the time interval between t12 and t14), the moderate pressure build-up mode (see the time interval between t14 and t17), the high-pressure hold mode (see the time interval between t17 and t18), and the pressure-reduction mode (see the time interval between t18 and t20). As seen in FIG. 10D, on the supposition that the motor is in trouble, the voltage signal VM (corresponding to the terminal voltage of the motor 15 of the return pump) remains on the zero-voltage line during the simulation. Therefore, there is no flow of brake fluid exhausted from the front-wheel side reservoir tank 17F during the skid control at the pressure-reduction mode. As a result, the counted value tF of the front-wheel side pressure-reduction timer increases while the system is in the pressure-reduction mode. As seen in FIG. 10E, as soon as the counted value tF (the integrated value) of the front-wheel side timer reaches the preset time tAF via three pressure-reduction mode periods (between t3 and t4, between t11 and t12, and between t18 ad t20) and thus the front-wheel side reservoir tank 17F is filled to the full capacity, the flow of FIG. 9 proceeds from step S21 via step S25 to step S26. In this manner, the pressure-reduction indicative signals DSFL and DSFR and the pressure-hold indicative signals HSFL and HSFR, all associated with the front solenoid drive circuits 26FL and 26FR, are shifted to a logical value "0" and then the two exciting currents IFL and IFR are shifted to zero current at the time t20 when the condition of tF=tAF is satisfied. After the skid control of the front wheels 1FL and 1FR terminates at the time t20, the solenoid valves 12FL and 12FR associated with the front wheel-brake cylinders are held at their pressure build-up positions. Therefore, the master-cylinder pressure from the front section of the master cylinder 9 is fed directly to the front wheel-brake cylinders 16FL and 16FR with the two solenoid valves 12FL and 12FR fully opened. As a result, the respective front wheel-brake cylinder pressure tends to rise rapidly. Thereafter, suppose that the front-end skid or the front wheel-lock occurs at the time t21 or the front-left and front-right wheel speeds VWFL and VWFR drop to zero at t21 as indicated by the solid line of FIG. 10A. On the other hand, the rear wheel speeds VWRL and VWRR vary as indicated by the broken line in FIG. 10A. The simulation results related to the rear wheel side are herebelow described in detail by reference to the characteristic curve indicated by the broken line in FIG. 10A and the timing charts shown in FIGS. 10C, 10F and 10G.

As appreciated from comparison between the two characteristic curves respectively indicated by the solid line (V$_{WFL}$ and V$_{WFR}$) and the broken line (V$_{WRL}$ and V$_{WRR}$) in FIG. 10A, the rear wheel speeds (of the drive wheels) tend to shift to the deceleration state slower than the front wheel speeds (of the driven wheels). That is, as soon as the rear-left and rear-right wheel acceleration/deceleration indicative data V'$_{WRL}$ and V'$_{WRR}$ become less than the predetermined deceleration threshold α at the time t5 after the brakes are applied at the time t1, the control mode of the rear wheel-brake cylinders is shifted to the high-pressure hold mode. Thereafter, the slip-ratio indicative data S$_{RL}$ and S$_{RR}$ exceed the target slip ratio So at the time t6, the pressure-reduction mode for the rear wheel side is selected and thus the skid-control indicative flag FS$_i$ (i=RL, RR) and the pressure-reduction mode indicative flag FD$_i$ (i=RL, RR) for the rear wheels are set to "1". When the rear wheel acceleration/deceleration indicative data V'$_{WRL}$ and V'$_{WRR}$ exceed the predetermined acceleration threshold β at the time t8, the control mode for the front-wheel side is shifted from the pressure reduction mode to the low-pressure hold mode, with the result that the pressure-reduction mode indicative flag FD$_i$ (i=RL, RR) is reset to "0" to suspend the counted value tR to be incremented, while the skid-control indicative flag FS$_i$ (i=RL, RR) remains at "1". When the rear wheel acceleration/deceleration indicative data V'$_{WRL}$ and V'$_{WRR}$ become less than the predetermined acceleration threshold β at the time t10, the control mode for the respective rear wheel-brake cylinder is shifted to the moderate pressure build-up mode in response to which the cylinder pressures in the rear wheel-brake cylinders are built up stepwise. Thus, the rear wheel speeds V$_{WRL}$ and V$_{WRR}$ begin to decrease moderately. When the acceleration/deceleration indicative data V'$_{WRL}$ and V'$_{WRR}$ become less than the predetermined deceleration threshold α at the time t13, the control mode for the rear-wheel side is shifted to the high-pressure hold mode. Thereafter, the processor 23b resumes to count up the rear-wheel side pressure-reduction timer at the time t15 when the pressure-reduction mode for the rear-wheel side is set due to the slip-ratio indicative data S$_{RL}$ and S$_{RR}$ above the target slip ratio So. When the rear wheel acceleration/deceleration indicative data V'$_{WRL}$ and V'$_{WRR}$ become greater than the predetermined acceleration threshold β at the time t16, the control mode for the rear-wheel side is shifted to the low-pressure hold mode. At this time t16, the pressure-reduction mode indicative flag FD$_i$ (i=RL, RR) is reset again to suspend the counted value tR to be incremented. The controller determines that the rear-wheel side reservoir tank is not still filled to the full capacity since the counted value tR does not yet reach the preset time tAR at the time t16. Therefore, at the time t16, the flow proceeds from step S21 to step S25, and thus the skid control of the rear wheel side continues for a while. After this, when the acceleration/deceleration indicative data V'$_{WRL}$ and V'$_{WRR}$ become less than the predetermined acceleration threshold β at the time t19, the moderate pressure build-up mode is started. Thereafter, the control mode for the rear-wheel side is shifted to the high-pressure hold mode at the time t22 later than the time t20 when the control for the hydraulic actuator 10F of the front wheel side (or the skid control of the front wheels) is terminated or suspended. Suppose that the pressure-reduction mode for the rear wheel-brake cylinders resumes at the time t23. As a result the counted value tR of the timer begins to increase from the time t23, and then reaches the preset time tAR at the time t24. When the interrupt routine is triggered just after the time t24, the flow proceeds from step S21 to step S22. At step S22, the pressure-reduction indicative signals DS$_{RL}$ and DS$_{RR}$ and the pressure-hold indicative signals HS$_{RL}$ and HS$_{RR}$, all associated with the rear solenoid drive circuits 26RL and 26RR included in the hydraulic actuator 10R of the rear wheel side, are shifted to a logical value "0" and then the two exciting currents I$_{RL}$ and I$_{RR}$ are shifted to zero current, as seen in FIG. 10C. As a consequence, the solenoid valves 12RL and 12RR are shifted to their pressure build-up positions and simultaneously the skid control of the rear wheels is terminated with the flag FS$_i$ (i=RL, RR) reset. Thereafter, step S13 proceeds to shift both the motor control signal S$_M$ and the actuator control signal S$_A$ to a low signal level. Thus, as seen in FIG. 10G, the actuator relay 31 is switched off at the time t24 when the condition of tR=tAR (but not the condition of tF=tAF) is satisfied. As a result no current can flow across the solenoid SL of the solenoid valve 12$i$ (i=FL, FR, RL, RR) after the time t24. Also, through step S14, the output interface circuit 23d outputs the warning signal S$_D$ to the warning indicating circuit 32 to activate it, and as a result the warning indicator lamp is flashed on and off and/or the warning buzzer emits a buzzing sound to warn the vehicle occupants that the electric motor 15 is in trouble.

As set forth above, according to the modified arithmetic processing of FIG. 9, on the one hand, the skid control of the front wheels (or the hydraulic actuator 10F) continues until the reservoir tank 17F of the front wheel side is filled to the full capacity from the beginning of the skid control of the front wheels and ends as soon as the reservoir tank 17F is filled to the full capacity (the condition of tF=tAF is satisfied). On the other hand, the skid control of the rear wheels (or the hydraulic actuator 10R) continues until the reservoir tank 17R of the rear wheel side is filled to the full capacity from the beginning of the skid control of the rear wheels, and ends as soon as the reservoir tank 17R is filled to the full capacity (the condition of tR=tAR is satisfied). Additionally, at the same time when the reservoir tank 17R is filled to the full capacity (the condition of tR=tAR is satisfied), a series of anti-lock brake control procedures finish.

As discussed above, according to the modified arithmetic processing of FIG. 9, when the skid control begins and the skid-control state indicative flag FS$_i$ is set after the brakes are applied, the system first makes a diagnosis on the motor trouble (see step S7 of FIG. 9). In the event that the system determines that the motor is in trouble (the motor coil is broken for example), the system functions to stop only the skid control of the hydraulic actuator 10F of the front wheel side if the counted value tF of the reduction-pressure timer of the front wheel side reaches the preset time tAF or the front-wheel side reservoir tank 17F is filled to the full capacity. The system also functions to effectively continue the skid control of the rear wheels (the hydraulic actuator 10R) until the counted value tR of the reduction-pressure timer of the rear wheel side reaches the preset time tAR or the rear-wheel side reservoir tank 17R is filled to the full capacity even in the presence of the motor trouble. That is to say, the skid control of the front wheels and the skid control of the rear wheels are separately executed, however if the condition of tR=tAR is satisfied or the rear-wheel side reservoir tank 17R is filled to the full capacity, a series of skid control procedures are completely terminated, in other words the skid controls of both the front-wheel side and the rear-wheel side terminate simultaneously. Thus, as compared with the routine shown in FIG. 5, the routine shown in FIG. 9 can effectively continue a series of anti-lock brake control procedures for a longer time duration, as appreciated from comparison between the time interval between t3 and t12 in FIG. 7F and the time interval between t3 in FIG. 10E and tR24 in FIG. 10F. This greatly improve the performance of the anti-lock brake control even in presence of motor trouble and thus the driving stability of the vehicle may be greatly enhanced. Furthermore, as can be appreciated from the flow from step S21 via step S22 to step S13, the actuator relay 31 is switched off only when the counted value tR of the reduction-pressure timer of the rear wheel side reaches the preset time tAR or the rear-wheel side reservoir tank 17R is filled to the full capacity. In other words, when a series of anti-lock brake control procedures come to the end due to the actuator relay switched off under the condition of tR=tAR and then the rear wheels 1RL and 1RR may skid, the front wheels may shift to skidding (wheel-lock) forcibly almost at the same timing as the rear wheel-lock. This prevents the rear wheels from shifting to a skidding condition at the timing earlier than the front wheel-lock (or the front-end skid), and thus the driving stability and controllability of the vehicle are improved. Additionally, since the vehicle speed properly considerably slows down at the time when the anti-lock brake control is stopped, the vehicle can be easily controlled and stopped satisfactorily by the driver even if the front-end skid (the front wheel-lock) and the rear-end skid (the rear wheel-lock) take place simultaneously.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is;:

1. At anti-lock brake control system for an automotive vehicle having road wheels, comprising:
    a wheel-brake cylinder associated with one of the road wheels to provide a braking action at the associated road wheel and being controllable according to a skid control when the associated road wheel begins to skid;
    a hydraulic pressure actuating unit adapted to be fluidly connected to said wheel-brake cylinder to feed and exhaust brake fluid to and from said wheel-brake cylinder, and having at least one reservoir tank provided for temporarily storing brake fluid exhausted from said wheel-brake cylinder via a return line and a return pump driven by an electric motor and provided for exhausting the brake fluid stored in said reservoir tank toward a main brake-fluid line;
    wheel speed sensors provided for detecting wheel speeds of said road wheels and for generating signals indicative of said wheel speeds;
    a controller for executing a skid control of said hydraulic pressure actuating unit in response to said signals from said wheel speed sensors;
    a diagnostic system for diagnosing trouble of said electric motor; and
    a monitoring device for monitoring an amount of brake fluid stored in said reservoir tank when said diagnostic system determines that said electric motor is in trouble,
    wherein said controller continues to permit skid control of said hydraulic pressure actuating unit after said diagnostic system determines that said electric motor is in trouble and terminates the skid control of said hydraulic pressure actuating unit when the amount of brake fluid monitored by said monitoring device reaches a preset value.

2. An anti-lock brake control system as claimed in claim 1, wherein said monitoring device is configured to estimate the amount of brake fluid stored in said reservoir tank by counting an integrated value of time intervals of pressure-reduction modes during the skid control, when said diagnostic system determines that said electric motor is in trouble.

3. An anti-lock brake control system as claimed in claim 1, wherein said monitoring device is configured to measure a volumetric flow of brake fluid flowing into said reservoir tank and to estimate the amount of brake fluid stored in said reservoir tank by integrating the volumetric flow measured, when said diagnostic system determines that said electric motor is in trouble.

4. An anti-lock brake control system as claimed in claim 1, wherein said monitoring device is configured to directly detect the amount of brake fluid stored in said reservoir tank, when said diagnostic system determines that said electric motor is in trouble.

5. An anti-lock brake control system as claimed in claim 1, wherein said hydraulic pressure actuating unit comprises a first hydraulic actuator fluidly connected to front wheel-brake cylinders and having a first reservoir tank for temporarily storing brake fluid exhausted from said front wheel-brake cylinders via a first return line and a common return pump driven by an electric motor and provided for exhausting the brake fluid stored in said first reservoir tank toward a first main brake-fluid line, and a second hydraulic actuator fluidly connected to rear wheel-brake cylinders and having a second reservoir tank for temporarily storing brake fluid exhausted from said rear wheel-brake cylinders via a second return line separated from said first return line and said common return pump and provided for exhausting the brake fluid stored in said second reservoir tank toward a second main brake-fluid line separated from said first main brake-fluid line, and said monitoring device is configured to monitor an amount of brake fluid stored in said first reservoir tank and an amount of brake fluid stored in said second reservoir tank as individual data when said diagnostic system determines that said electric motor is in trouble,
    wherein said controller terminates a skid control of said first hydraulic actuator when the amount of brake fluid stored in said first reservoir tank reaches a first preset value, and terminates a skid control of said second hydraulic actuator when the amount of brake fluid stored in said second reservoir tank reaches a second preset value.

6. An anti-lock brake control system as claimed in claim 5, wherein said monitoring device is configured to estimate the amount of brake fluid stored in said first reservoir tank by counting an integrated value of time intervals of pressure-reduction modes during the skid control of said first hydraulic actuator and to estimate the amount of brake fluid stored in said second reservoir tank by counting an integrated value of time intervals of pressure-reduction modes during the skid control of said second hydraulic actuator, when said diagnostic system determines that said electric motor is in trouble.

7. An anti-lock brake control system as claimed in claim 5, wherein said monitoring device is configured to measure a volumetric flow of brake fluid flowing into said first reservoir tank and a volumetric flow of brake fluid flowing into said second reservoir tank, and to estimate the amount of brake fluid stored in said first reservoir tank and the amount of brake fluid stored in said second reservoir tank by individually integrating the volumetric flows measured at said first and second reservoir tanks, when said diagnostic system determines that said electric motor is in trouble.

8. An anti-lock brake control system as claimed in claim 5, wherein said monitoring device is configured to directly detect the amount of brake fluid stored in each of said first and second reservoir tanks, when said diagnostic system determines that said electric motor is in trouble.

9. An anti-lock brake control system for an automotive vehicle having road wheels, comprising:
   wheel-brake cylinders each associated with one of the road wheels to provide a braking action at the associated road wheel and being controllable according to a skid control when the associated road wheel begins to skid;
   a first hydraulic actuator adapted to be fluidly connected to front wheel-brake cylinders associated with a first section of a tandem master cylinder to feed and exhaust brake fluid to and from said front wheel-brake cylinders, and having a first reservoir tank provided for temporarily storing brake fluid exhausted from said front wheel-brake cylinders via a first return line and a common return pump driven by an electric motor and provided for exhausting the brake fluid stored in said first reservoir tank toward a first main brake-fluid line;
   a second hydraulic actuator adapted to be fluidly connected to rear wheel-brake cylinders associated with a second section of the tandem master cylinder to feed and exhaust brake fluid to and from said rear wheel-brake cylinders, and having a second reservoir tank provided for temporarily storing brake fluid exhausted from said rear wheel-brake cylinders via a second return line and said common return pump and provided for exhausting the brake fluid stored in said second reservoir tank toward a second main brake-fluid line separated from said first main brake-fluid line;
   wheel speed sensors provided for detecting wheel speeds of said road wheels and for generating signals indicative of said wheel speeds;
   a controller for executing skid controls of said first and second hydraulic actuators in response to said signals from said wheel speed sensors;
   a diagnostic system for diagnosing trouble of said electric motor; and
   a monitoring device for monitoring individually an amount of brake fluid stored in said first reservoir tank and an amount of brake fluid stored in said second reservoir tank when said diagnostic system determines that said electric motor is in trouble,
   wherein said controller terminates the skid control of said first hydraulic actuator when the amount of brake fluid stored in said first reservoir tank reaches a first preset value, and terminates the skid control of said second hydraulic actuator when the amount of brake fluid stored in said second reservoir tank reaches a second preset value.

10. An anti-lock brake control system as claimed in claim 9, wherein said monitoring device is configured to estimate the amount of brake fluid stored in said first reservoir tank by counting an integrated value of time intervals of pressure-reduction modes during the skid control of said first hydraulic actuator and to estimate the amount of brake fluid stored in said second reservoir tank by counting an integrated value of time intervals of pressure-reduction modes during the skid control of said second hydraulic actuator, when said diagnostic system determines that said electric motor is in trouble.

11. An anti-lock brake control system as claimed in claim 9, wherein said monitoring device is configured to measure a volumetric flow of brake fluid flowing into said first reservoir tank and a volumetric flow of brake fluid flowing into said second reservoir tank, and to estimate the amount of brake fluid stored in said first reservoir tank and the amount of brake fluid stored in said second reservoir tank by individually integrating the volumetric flows measured at said first and second reservoir tanks, when said diagnostic system determines that said electric motor is in trouble.

12. An anti-lock brake control system as claimed in claim 9, wherein said monitoring device is configured to directly detect the amount of brake fluid stored in each of said first and second reservoir tanks, when said diagnostic system determines that said electric motor is in trouble.

13. An anti-lock brake control system as claimed in claim 9, wherein said controller simultaneously terminates the skid control of said first hydraulic actuator and the skid control of said second hydraulic actuator when one of a necessary condition that the amount of brake fluid stored in said first reservoir tank reaches the first preset value and a necessary condition that the amount of brake fluid stored in said second reservoir tank reaches the second preset value is satisfied.

14. An anti-lock brake control system as claimed in claim 9, wherein said controller simultaneously terminates the skid control of said first hydraulic actuator and the skid control of said second hydraulic actuator when a necessary condition that the amount of brake fluid stored in said second reservoir tank reaches the second preset value is satisfied irrespective of whether a necessary condition that the amount of brake fluid stored in said first reservoir tank reaches the first preset value is satisfied.

15. An anti-lock brake control system as claimed in claim 14, wherein said first preset value is a full capacity of said first reservoir tank and said second preset value is a full capacity of said second reservoir tank.

16. A method for preventing a skid of an automotive vehicle having an anti-lock brake control system in combination with a motor-trouble diagnostic system, said anti-lock brake control system having a common return pump and a first reservoir tank connected to a first return line and associated with front road wheels and a second reservoir tank connected to a second return line separated from said first return line and associated with rear road wheels, and said return pump having a driven connection with an electric motor, said method comprising the steps of:
   detecting wheel speeds of the front and rear road wheels installed on the vehicle and generating wheel-speed signals indicative of said wheel speeds;
   computing a slip ratio of each of said road wheels and a derivative value of each of said road wheels in response to said wheel-speed signals;
   comparing said slip ratio with a predetermined target slip ratio to produce a first comparison data;
   comparing said derivative value with both a predetermined threshold for an acceleration and a predetermined threshold for a deceleration to produce a second comparison data;
   performing a skid control of each of said road wheels in response to said first and second comparison data;
   diagnosing trouble of said electric motor;
   determining whether an amount of brake fluid stored in said first reservoir tank reaches a full capacity of said first reservoir tank;
   determining whether an amount of brake fluid stored in said second reservoir tank reaches a full capacity of said second reservoir tank; and
   simultaneously terminating a skid control of said front road wheels and a skid control of said rear road wheels when one of a necessary condition that the amount of brake fluid stored in said first reservoir tank reaches the full capacity of said first reservoir tank and a necessary condition that the amount of brake fluid stored in said second reservoir tank is satisfied reaches the full capacity of said second reservoir tank.

17. A method for preventing a skid of an automotive vehicle having an anti-lock brake control system in combination with a motor-trouble diagnostic system, said anti-lock brake control system having a common return pump and a first reservoir tank connected to a first return line and associated with front road wheels and a second reservoir tank connected to a second return line separated from said first return line and associated with rear road wheels, and said return pump having a driven connection with an electric motor, said method comprising the steps of:

- detecting wheel speeds of the front and rear road wheels installed on the vehicle and generating wheel-speed signals indicative of said wheel speeds;
- computing a slip ratio of each of said road wheels and a derivative value of each of said road wheels in response to said wheel-speed signals;
- comparing said slip ratio with a predetermined target slip ratio to produce a first comparison data;
- comparing said derivative value with both a predetermined threshold for an acceleration and a predetermined threshold for a deceleration to produce a second comparison data;
- performing a skid control of each of said road wheels in response to said first and second comparison data;
- diagnosing trouble of said electric motor;
- determining whether an amount of brake fluid stored in said first reservoir tank reaches a full capacity of said first reservoir tank;
- determining whether an amount of brake fluid stored in said second reservoir tank reaches a full capacity of said second reservoir tank; and
- simultaneously terminating a skid control of said front road wheels and a skid control of said rear road wheels when a necessary condition that the amount of brake fluid stored in said second reservoir tank reaches the full capacity of said second reservoir tank is satisfied irrespective of whether a necessary condition that the amount of brake fluid stored in said first reservoir tank reaches the full capacity of said first reservoir tank is satisfied.

* * * * *